United States Patent
Yamada et al.

(10) Patent No.: US 7,257,702 B2
(45) Date of Patent: Aug. 14, 2007

(54) BOOT TIME REDUCING DEVICE INCLUDING BOOT PREPARATION INSTRUCTING UNIT

(75) Inventors: Mikihiko Yamada, Ibaraki (JP); Norihiko Mizobata, Habikino (JP); Taku Arakawa, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 81 days.

(21) Appl. No.: 10/548,290

(22) PCT Filed: Apr. 16, 2004

(86) PCT No.: PCT/JP2004/005462

§ 371 (c)(1),
(2), (4) Date: Sep. 2, 2005

(87) PCT Pub. No.: WO2004/092934

PCT Pub. Date: Oct. 28, 2004

(65) Prior Publication Data

US 2006/0184780 A1    Aug. 17, 2006

(30) Foreign Application Priority Data

Apr. 17, 2003  (JP)  ............................. 2003-112359

(51) Int. Cl.
*G06F 9/455*  (2006.01)
(52) U.S. Cl. .............................................. 713/2; 713/1
(58) Field of Classification Search ..................... 713/1, 713/2
See application file for complete search history.

(56) References Cited

U.S. PATENT DOCUMENTS

| | | | | |
|---|---|---|---|---|
| 5,836,013 A | * | 11/1998 | Greene et al. .................. | 713/2 |
| 6,052,779 A | * | 4/2000 | Jackson et al. ................ | 713/2 |
| 6,158,000 A | * | 12/2000 | Collins .......................... | 713/1 |
| 6,226,740 B1 | | 5/2001 | Iga | |
| 6,275,932 B1 | | 8/2001 | Yamaguchi et al. | |
| 6,282,655 B1 | | 8/2001 | Given | |
| 6,560,711 B1 | | 5/2003 | Given et al. | |
| 6,772,253 B1 | * | 8/2004 | Slaight et al. ............... | 710/105 |
| 6,829,714 B2 | * | 12/2004 | Smith et al. ................. | 713/330 |
| 6,883,091 B2 | * | 4/2005 | Morrison et al. ............... | 713/2 |

(Continued)

FOREIGN PATENT DOCUMENTS

EP    1158273    11/2001

(Continued)

OTHER PUBLICATIONS

English language Abstract of JP 8-223311.

(Continued)

*Primary Examiner*—Chun Cao
(74) *Attorney, Agent, or Firm*—Greenblum & Bernstein, P.L.C.

(57) ABSTRACT

With a temporary operating unit being operating, a user provides a boot timing using a boot timing instructing unit. This causes a CPU to compute a boot preparation timing based on the boot timing, and store the boot timing and boot preparation timing to a boot timing memory. At this time, a timer begins a time-keeping operation. After that, the user turns off the power to the temporary operating unit. A boot preparation instructing unit determines whether or not the time being measured by the timer coincides with the boot preparation timing stored in the boot timing memory. When the time measured by the timer coincides with the boot preparation timing stored in the boot timing memory, the boot preparation instructing unit provides the CPU with a boot preparation instruction. This turns on the power to the temporary operating unit, and the CPU performs a boot preparation.

13 Claims, 20 Drawing Sheets

U.S. PATENT DOCUMENTS

| | | | |
|---|---|---|---|
| 2002/0048460 A1 | 4/2002 | Kitawaki | |
| 2002/0069354 A1* | 6/2002 | Fallon et al. | 713/2 |
| 2002/0148655 A1 | 10/2002 | Cho et al. | |
| 2002/0199093 A1 | 12/2002 | Poisner et al. | |
| 2003/0005223 A1 | 1/2003 | Coulson et al. | |
| 2003/0009654 A1* | 1/2003 | Nalawadi et al. | 713/1 |
| 2004/0078539 A1* | 4/2004 | Fulghum | 711/170 |
| 2005/0268083 A1 | 12/2005 | Poisner et al. | |

FOREIGN PATENT DOCUMENTS

| | | |
|---|---|---|
| JP | 62-139020 | 6/1987 |
| JP | 2-093717 | 4/1990 |
| JP | 7-025451 | 1/1995 |
| JP | 7-271561 | 10/1995 |
| JP | 8-147170 | 6/1996 |
| JP | 8-223281 | 8/1996 |
| JP | 8-223311 | 8/1996 |
| JP | 10-98521 | 4/1998 |
| JP | 11-212893 | 8/1999 |
| JP | 11-305883 | 11/1999 |
| JP | 2000 3233 | 1/2000 |
| JP | 2001-7961 | 1/2001 |
| JP | 2001-91289 | 4/2001 |
| JP | 2001-306173 | 11/2001 |
| JP | 2002-132373 | 5/2002 |
| JP | 2002-157040 | 5/2002 |
| JP | 2002-157050 | 5/2002 |
| JP | 2003-29915 | 1/2003 |
| JP | 2003-58959 | 2/2003 |
| JP | 2003-67074 | 3/2003 |
| JP | 2003-85679 | 3/2003 |
| WO | 97/42559 | 11/1997 |

OTHER PUBLICATIONS

English language Abstract of JP 2-093717.
English language Abstract of JP 2000-3233.
English language Abstract of JP 62-139020.
English language Abstract of JP 11-212893.
English language Abstract of JP 7-271561.
English language Abstract of JP 2002-132373.
English language Abstract of JP 7-025451.
English language Abstract of JP2003-085679.
English language Abstract of JP 10-098521.
English language Abstract of JP 2003-058959.
English language Abstract of JP 2003-029915.
English language Abstract of JP 2001-091289.
English language Abstract of JP 11-305883.
English language Abstract of JP 8-223281.
English language Abstract of JP 2003-067074.
English language Abstract of JP 2002-157040.
English language Abstract of JP 2002-157050.
English language Abstract of JP 2001-306173.
English language Abstract of JP 08-147170.
English language Abstract of JP 2001-7961.

* cited by examiner

F I G. 6
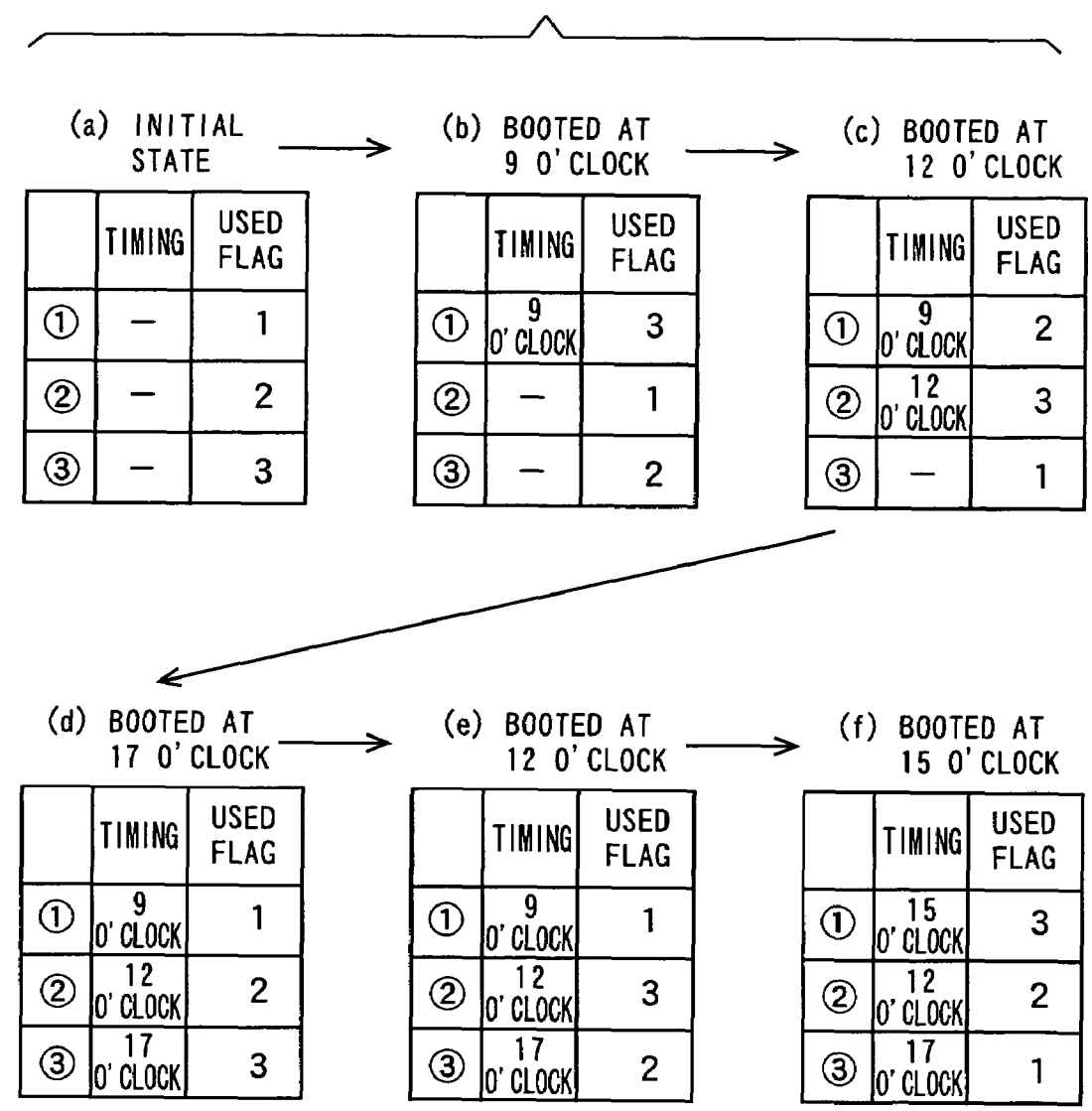

BOOT TIME REDUCING DEVICE INCLUDING BOOT PREPARATION INSTRUCTING UNIT

TECHNICAL FIELD

The present invention relates to a boot time reducing device that reduces the time for an electronic apparatus to become usable after a boot instruction, and an electronic apparatus including the boot time reducing device.

BACKGROUND ART

With the recently increased diversity and networking in home appliances, programs for controlling home appliances have rapidly enlarged in scale. This has resulted in a longer time for an electronic apparatus to become usable after a boot instruction by a user.

A large-scaled program is typically compressed in order to reduce the capacity needed in a memory that stores the program. This necessitates time for expanding the compressed program during the boot time of a home appliance, which further increases the boot time.

A technique is suggested in which an image formation system comprising a master device and a slave device predicts the warm-up time of the slave device (refer to JP 2001-7961). In this image formation system, the master device alone boots itself first for the purpose of lower power consumption, and the master device compares, when performing a job with long processing time, the job processing time and the predicted warm-up time of the slave device. Based on the result obtained, the master device determines whether to perform the job alone or perform it in parallel with the slave device.

The above-described technique of the image formation system, however, is intended to reduce the power consumption, and does not lead to a reduction in boot time.

DISCLOSURE OF INVENTION

An object of the present invention is to provide a boot time reducing device that enables less time for an electronic apparatus to become usable after a boot instruction by user.

Another object of the present invention is to provide an electronic apparatus that takes less time to become usable after a boot instruction by a user.

According to one aspect of the present invention, there is provided a boot time reducing device for reducing the boot time of an electronic apparatus that boots up in response to a boot instruction, comprising a controller that performs a boot process of the electronic apparatus in response to a boot instruction, and a boot preparation instructing unit that predicts generation of the boot instruction, and instructs to perform at least part of the boot process at a timing earlier than the predicted boot instruction timing, the controller performing the at least part of the boot process of the electronic apparatus in response to the instruction of the boot preparation instructing unit.

In the boot time reducing device, the boot preparation instructing unit predicts the generation of a boot instruction and instructs to perform the at least part of the boot process at a timing earlier than the predicted boot instruction timing. In response to the instruction, the controller performs the at least part of the boot process of the electronic apparatus.

In this way, the at least part of the boot process is performed earlier than the generation of the boot instruction for the electronic apparatus, which enables a reduced time for the electronic apparatus to become usable after the boot instruction.

The boot time reducing device may further comprise a setting device that presets a boot timing for the electronic apparatus, wherein the boot preparation instructing unit instructs the controller to perform the at least part of the boot process at a timing earlier by a prescribed time than the boot timing set by the setting device.

In this case, the generation of the boot instruction is predicted based on the preset boot timing for the electronic apparatus, and the at least part of the boot process is performed at a timing earlier by a prescribed time than the predicted boot instruction. This results in a reduced time for the electronic apparatus to become usable after the boot instruction.

The boot time reducing device may further comprise a storage device that stores a timing at which the electronic apparatus was booted, wherein the boot preparation instructing unit instructs the controller to perform the at least part of the boot process at a timing earlier by a prescribed time than the timing stored in the storage device.

In this case, the generation of the boot instruction is predicted based on the timing at which the electronic apparatus was last booted, and the at least part of the boot process is performed at a timing earlier by a prescribed time than the predicted boot instruction timing. This results in a reduced time for the electronic apparatus to become usable after the boot instruction.

The boot time reducing device may further comprise a manipulation device that generates an instruction to boot the electronic apparatus by user manipulation, wherein the boot preparation instructing unit includes a predictor that predicts manipulation of the manipulation device by the user; and an instruction generator that instructs the controller to perform the at least part of the boot process based on a prediction by the predictor.

In this case, the manipulation of the manipulation device by the user is predicted, and based on the prediction, the generation of a boot instruction is predicted. The at least part of the boot process is then performed at a timing earlier by a prescribed time than the predicted boot instruction. This results in a reduced time for the electronic apparatus to become usable after the boot instruction.

The predictor may include a pressure sensor detecting that the user has touched the manipulation device based on a change in pressure.

In this case, based on a change in pressure, it is detected that the user has touched the manipulation device. This allows prediction of the manipulation of the manipulation device by the user.

The predictor may include a temperature sensor detecting that the user has touched the manipulation device based on a change in temperature.

In this case, based on a change in temperature, it is detected that the user has touched the manipulation device. This allows prediction of the manipulation of the manipulation device by the user.

The predictor may include a gyrosensor detecting that the user has moved the manipulation device based on a change in angular velocity.

In this case, based on a change in angular velocity, it is detected that the user has moved the manipulation device. This allows prediction of the manipulation of the manipulation device by the user.

The boot preparation instructing unit may include a sensor that detects the presence or approach of a person, and an instruction generator that instructs the controller to perform the at least part of the boot process based on a detection by the sensor.

In this case, the sensor detects the presence or approach of the person, and the generation of a boot instruction is predicted based on the detection. The at least part of the boot process is then performed at a timing earlier by a prescribed time than the predicted boot instruction timing. This results in a reduced time for the electronic apparatus to become usable after the boot instruction.

The sensor may include an infrared sensor that detects the presence or approach of a person by infrared radiation.

In this case, the presence or approach of the person is detected by infrared radiation. This allows prediction of the generation of a boot instruction.

The sensor may include a voice input device that detects the presence or approach of a person based on voice input.

In this case, the presence or approach of the person is detected based on voice input. This allows prediction of the generation of a boot instruction.

The sensor may further include a storage device that stores information on the voice print of a registered person, and a determiner that determines the presence or approach of the registered person by a comparison of a voice inputted through the voice input device with the information stored in the storage device, and wherein the instruction generator instructs the controller to perform the at least part of the boot process when the determiner has determined that the registered person is present or approached.

In this case, the information on the voice print of the registered person is stored in the storage device, and the presence or approach of the registered person is determined by a comparison of the voice inputted through the voice input device with the information stored in the storage device. In the case of a determination that the registered person is present or approached, the generation of a boot instruction is predicted, and the at least part of the boot process is performed at a timing earlier by a prescribed time than the predicted boot instruction timing. This results in a reduced time for the electronic apparatus to become usable after the boot instruction.

The sensor may include a storage device that stores information for identifying a registered radio device, a receiver that receives a signal from the radio device, and a determiner that determines the presence or approach of the registered radio device by a comparison of the signal received through the receiver with the information stored in the storage device, and wherein the instruction generator instructs the controller to perform the at least part of the boot process when the determiner has determined that the registered radio device is present or approached.

In this case, the information for identifying the registered radio device is stored in the storage device. Followed by reception of the signal from the radio device, the presence or approach of the registered radio device is determined by a comparison of the received signal with the information stored in the storage device. In the case of a determination that the registered radio device is present or approached, the generation of a boot instruction is predicted, and the at least part of the boot process is performed at a timing earlier by a prescribed timing than the predicted boot instruction timing. This results in a reduced time for the electronic apparatus to become usable after the boot instruction.

The sensor may include a power measuring device that detects the presence or approach of a person based on a change in power consumption of the electronic apparatus.

In this case, the presence or approach of the person is detected based on a change in power consumption of the electronic apparatus, and the generation of a boot instruction is predicted based on the detection. At least part of the boot process is then performed at a timing earlier by a prescribed time than the predicted boot instruction timing. This results in a reduced time for the electronic apparatus to become usable after the boot instruction.

The sensor may include an optical sensor that detects the presence or approach of a person based on a change in an amount of light.

In this case, the presence or approach of the person is detected based on a change in the amount of light, and the generation of a boot instruction is predicted based on the detection. The at least part of the boot process is then performed at a timing earlier by a prescribed time than the predicted boot instruction timing. This results in a reduced time for the electronic apparatus to become usable after the boot instruction.

The electronic apparatus may include a program storage device that stores a program, a main storage device, and a processing device that executes the program stored in the program storage device on the main storage device, wherein the at least part of the boot process includes at least one of expanding the program, transferring the program from the program storage device to the main storage device, and executing part of the program.

In this case, the program stored in the program storage device is executed on the main storage device. At a timing earlier by a prescribed time than a predicted boot instruction timing, at least one of expanding the program, transferring the program from the program storage device to the main storage device, and executing part of the program is performed. This results in a reduced time for the electronic apparatus to become usable after the boot instruction.

The controller may release the boot process when the controller fails to receive a boot instruction within a prescribed time after the beginning of performing the at least part of the boot process of the electronic apparatus.

In this case, the boot process is released when a predicted boot instruction is not generated within a prescribed time after the beginning of performing the at least part of the boot process of the electronic apparatus. This enables a reduction in wasted power consumption.

The electronic apparatus may comprise a television module that displays a television program and a personal computer connected to the television module, and wherein the controller performs at least part of a boot process of the personal computer in response to an instruction of the boot preparation instructing unit.

In this case, the at least part of the boot process of the personal computer which takes a long time in booting is performed at a timing earlier by a prescribed time than a predicted boot instruction timing for the television module. This results in a reduced time for the television module and personal computer to become usable after the boot instruction.

According to another aspect of the present invention, there is provided an electronic apparatus comprising an operating unit that performs a prescribed operation, a controller that performs a boot process of the operating unit in response to a boot instruction, and a boot preparation instructing unit that predicts generation of the boot instruction, and instructs to perform at least part of the boot process at a timing earlier than the predicted boot instruction timing, wherein the controller performs the at least part of the boot process of the operating unit in response to the instruction of the boot preparation instructing unit.

In the electronic apparatus, the boot preparation instructing unit predicts the generation of a boot instruction and instructs to perform the at least part of the boot process at a timing earlier than the predicted boot instruction timing. In response to the instruction, the controller performs the at least part of the boot process of the operating unit.

In this way, the at least part of the boot process is performed earlier than the generation of the boot instruction for the operating unit, which enables a reduced time for the electronic apparatus to become usable after the boot instruction.

The electronic apparatus may further comprise an interface bus that provides communication with other one or more devices, wherein the boot preparation instructing unit instructs the controller to perform the at least part of the boot process while instructing via the interface bus the other one or more devices to perform at least part of a boot process.

In this case, the controller of the electronic apparatus is instructed to perform the at least part of the boot process while the other one or more devices are instructed via the interface bus to perform the at least part of the boot process. This allows the at least part of the boot process to be performed earlier than the generation of the boot instruction for the other one or more devices that are connected to the electronic apparatus. This results in a reduced time for the other one or more devices connected to the electronic apparatus to become usable after the boot instruction.

The boot preparation instructing unit may issue a request-to-send to the other one or more devices via the interface bus, and in response to an acknowledgment-to-send from the other one or more devices, the boot preparation instructing unit may instruct the other one or more devices via the interface bus to perform the at least part of the boot process.

In this case, the request-to-send is issued to the other one or more devices via the interface bus, and in response to the acknowledgment-to-send from the other one or more devices, the boot preparation instructing unit instructs the other one or more devices via the interface bus to perform the at least part of the boot process. This ensures that the other one or more devices are instructed to perform the at least part of the boot process.

BRIEF DESCRIPTION OF DRAWINGS

FIG. 6 is a schematic diagram for use in illustrating operations for storing a plurality of boot timings to the boot timing memory;

BEST MODE FOR CARRYING OUT THE INVENTION

First Embodiment

Figure 1:
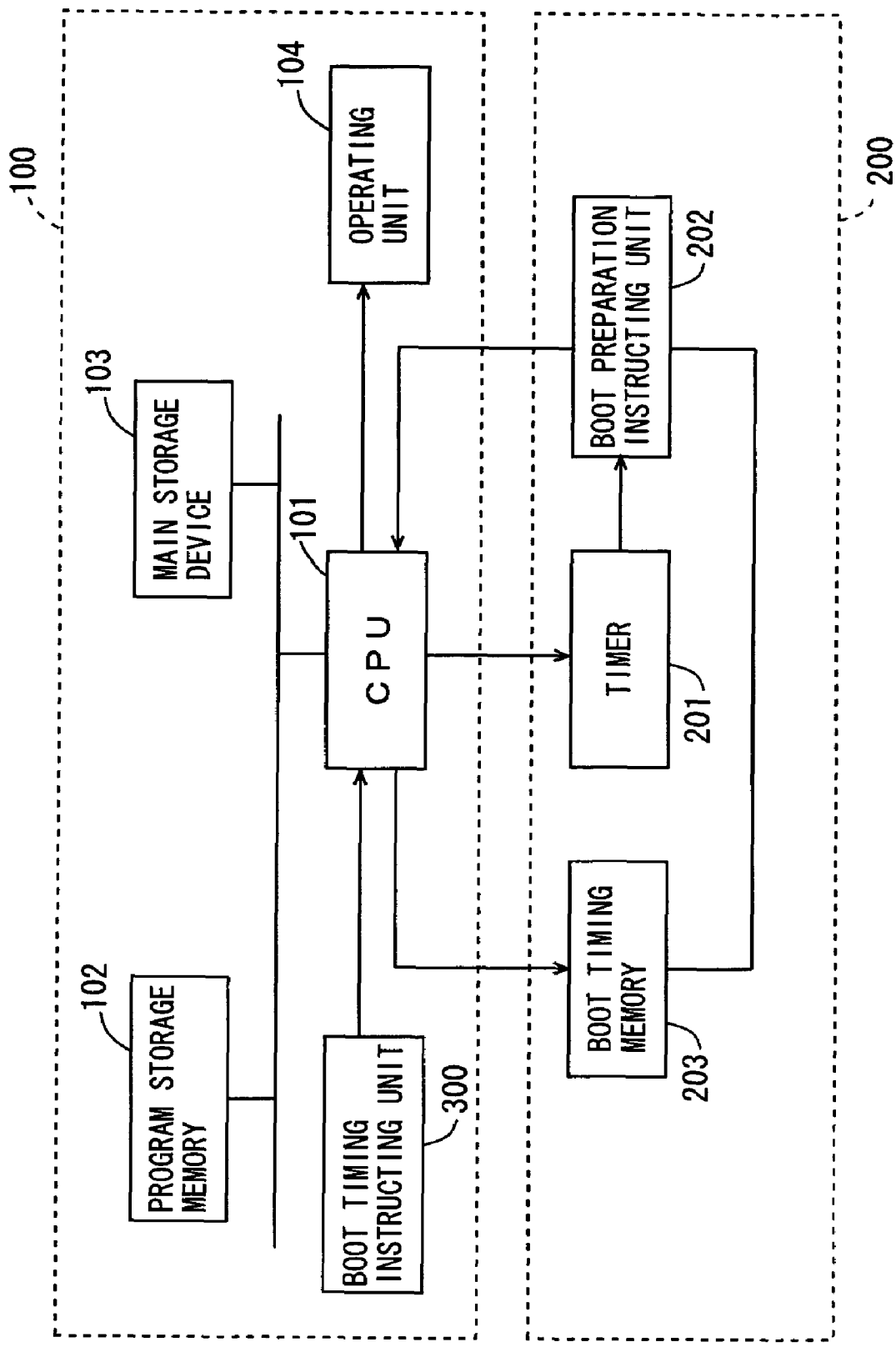
FIG. 1 is a block diagram showing the configuration of an electronic apparatus that includes a boot time reducing device according to a first embodiment of the invention.

FIG. 1 is a block diagram showing the configuration of an electronic apparatus that includes a boot time reducing device according to a first embodiment of the invention.

As shown in FIG. 1, the electronic apparatus includes a temporary (part-time) operating unit 100 and a normally (full-time) operating unit 200. The temporary operating unit 100, corresponding to a portion of the electronic apparatus that is not normally operating, starts operation in response to a boot instruction. Note that the boot instruction is generated when a user switches on the electronic apparatus or by user manipulation of a remote control or at a time preset by a timer. In this embodiment, the boot instruction is generated at a timer preset time.

The normally operating unit 200, corresponding to a portion of the electronic apparatus that is normally operating, provides the temporary operating unit 100 with a boot preparation instruction. A boot preparation will be discussed below.

The temporary operating unit 100 includes a CPU (Central Processing device) 101, a program storage memory 102, a main storage device 103, an operating unit 104, and a boot timing instructing unit 300. The normally operating unit 200 includes a timer 201, a boot preparation instructing unit 202, and a boot timing memory 203.

The CPU 101 controls the entire electronic apparatus. In this embodiment, the CPU 101 performs a boot preparation in response to a boot preparation instruction from the boot preparation instructing unit 202.

The program storage memory 102 is a storage device that stores a program for the CPU 101. The program storage memory 102 may be an external storage device such as a hard disk or a semiconductor memory such as ROM (Read Only Memory . The program stored in the program storage memory 102 may be compressed to reduce the memory capacity or may not be compressed. It should be noted, however, that a minimum portion of the program needed to boot the temporary operating unit 100 is not compressed. If the program stored in the program storage memory 102 is compressed, the CPU 101 or an auxiliary device not shown here expands the compressed program during a boot preparation and transfers the expanded program to the main storage device 103.

The main storage device 103 functions as a working memory of the CPU 101, and stores an executable program.

The operating unit 104 performs a prescribed operation according to a particular use of the electronic apparatus. When the electronic apparatus is a television receiver, the operating unit 104 includes a tuner, a video processing circuit, an audio processing circuit, a display device, an audio output device, etc. When the electronic apparatus is a data reproducing device such as a DVD (Digital Versatile Disk) reproducing device, the operating unit 104 includes a recording medium drive, a demodulator circuit, a video processing circuit, an audio processing circuit, a display device, an audio output device, etc.

The boot timing instructing unit 300, which includes a remote control or a numeric keypad, etc., provides the CPU 101 with a boot timing according to the user manipulation. The CPU 101 computes a boot preparation timing based on the boot timing provided by the boot timing instructing unit 300, and stores the boot timing and boot preparation timing to the boot timing memory 203. As used herein, the term boot timing refers to the timing at which the user starts to use the electronic apparatus, which is set by user manipulation. The term boot preparation timing refers to the timing at which a boot preparation is started according to a boot preparation instruction. The boot preparation timing is set earlier than the timing at which the user starts to use the electronic apparatus by an amount of time necessary for the boot preparation of the electronic apparatus.

As used herein the term boot preparation includes one or all of the operations of: expanding the compressed program stored in the program storage memory 102; transferring the program stored in the program storage memory 102 to the main storage device 103; and executing a portion of the program via the CPU 101.

Note that the boot timing may be expressed as a relative elapsed time with reference to a certain time or as an absolute time. Similarly, the boot preparation timing may be expressed as a relative elapsed time with reference to a certain time or as an absolute time. The certain time may, for example, be a boot timing for the electronic apparatus which is timer preset by the user.

The timer 201, operating according to the CPU control, measures time. The boot preparation instructing unit 202 compares the time being measured by the timer 201 and the boot preparation timing stored in the boot timing memory 203 to determine whether it is the boot preparation timing. When the boot preparation timing has come, the boot preparation instructing unit 202 provides the CPU with a boot preparation instruction. The boot preparation instructing unit 202 is composed of a comparator, microcomputer, etc.

In the electronic apparatus of FIG. 1, the CPU 101, timer 201, boot preparation instructing unit 202, boot timing memory 203, and boot timing instructing unit 300 form a boot time reducing device.

Figure 2:
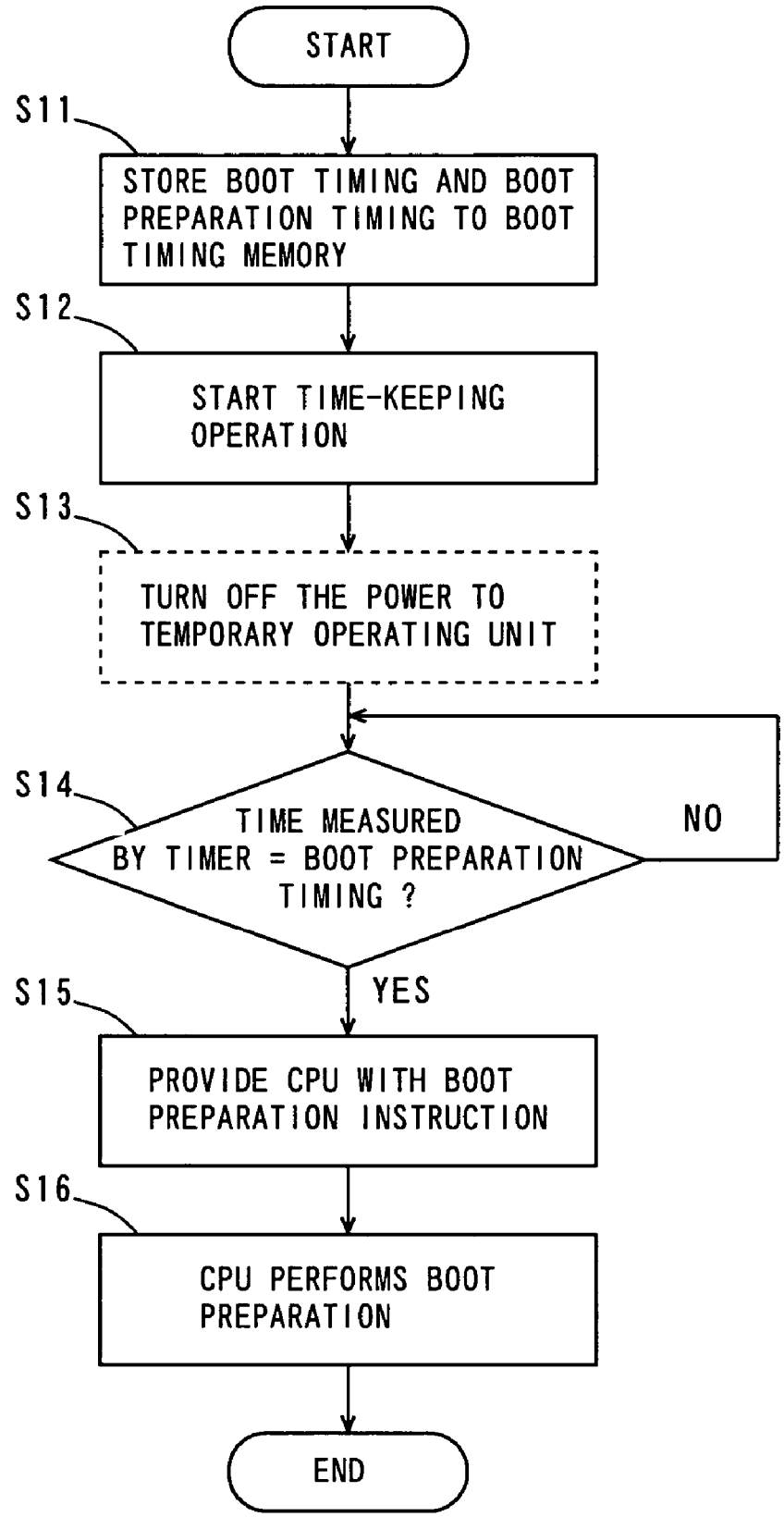
FIG. 2 is a flowchart showing operations of the boot time reducing device in the electronic apparatus of FIG. 1.

FIG. 2 is a flowchart showing operations of the boot time reducing device in the electronic apparatus of FIG. 1.

In FIG. 2 as well as in FIG. 4, FIG. 8, FIG. 10, FIG. 12, FIG. 14, FIG. 16, FIG. 18, and FIG. 20 shown below, the block in dotted line represents an operation by the user, and other blocks in solid line represent processings performed by each of the temporary operating unit 100 and normally operating unit 200.

With the temporary operating unit 100 being operating, the user first provides a boot timing using the boot timing instructing unit 300. This causes the CPU 101 to compute a boot preparation timing based on the boot timing, and store the boot timing and boot preparation timing to the boot timing memory 203 (Step S11). At this time, the timer 201 begins a time-keeping operation (Step S12).

After that, the user turns off the power to the temporary operating unit 100 (Step S13). The boot preparation instructing unit 202 determines whether or not the time being measured by the timer 201 coincides with the boot preparation timing stored in the boot timing memory 203 (Step S14).

When the time measured by the timer 201 coincides with the boot preparation timing stored in the boot timing memory 203, the boot preparation instructing unit 202 provides the CPU 101 with a boot preparation instruction (Step S15). This turns on the power to the temporary operating unit 100, and the CPU 101 performs a boot preparation (Step S16).

After the CPU 101 has completed the boot preparation, the electronic apparatus boots up at the boot timing as stored in the boot timing memory 203.

The boot time reducing device according to the embodiment allows the generation of a boot instruction to be predicted based on the boot timing for the electronic apparatus which is preset by the user. In this way, the boot preparation can be started before the electronic apparatus boot timing, resulting in a reduced time between the boot timing and the time that the electronic apparatus becomes usable.

For an electronic apparatus comprising a personal computer and a digital television module, in particular, the boot preparation for the personal computer requiring a long time in booting can be started before the boot timing for the digital television module. This results in a reduced boot time of the electronic apparatus.

In this embodiment, the CPU 101 corresponds to a controller and a processing device; the boot timing instructing unit 300 corresponds to a setting device; and the program storage memory 102 corresponds to a program storage device.

Second Embodiment

Figure 3:
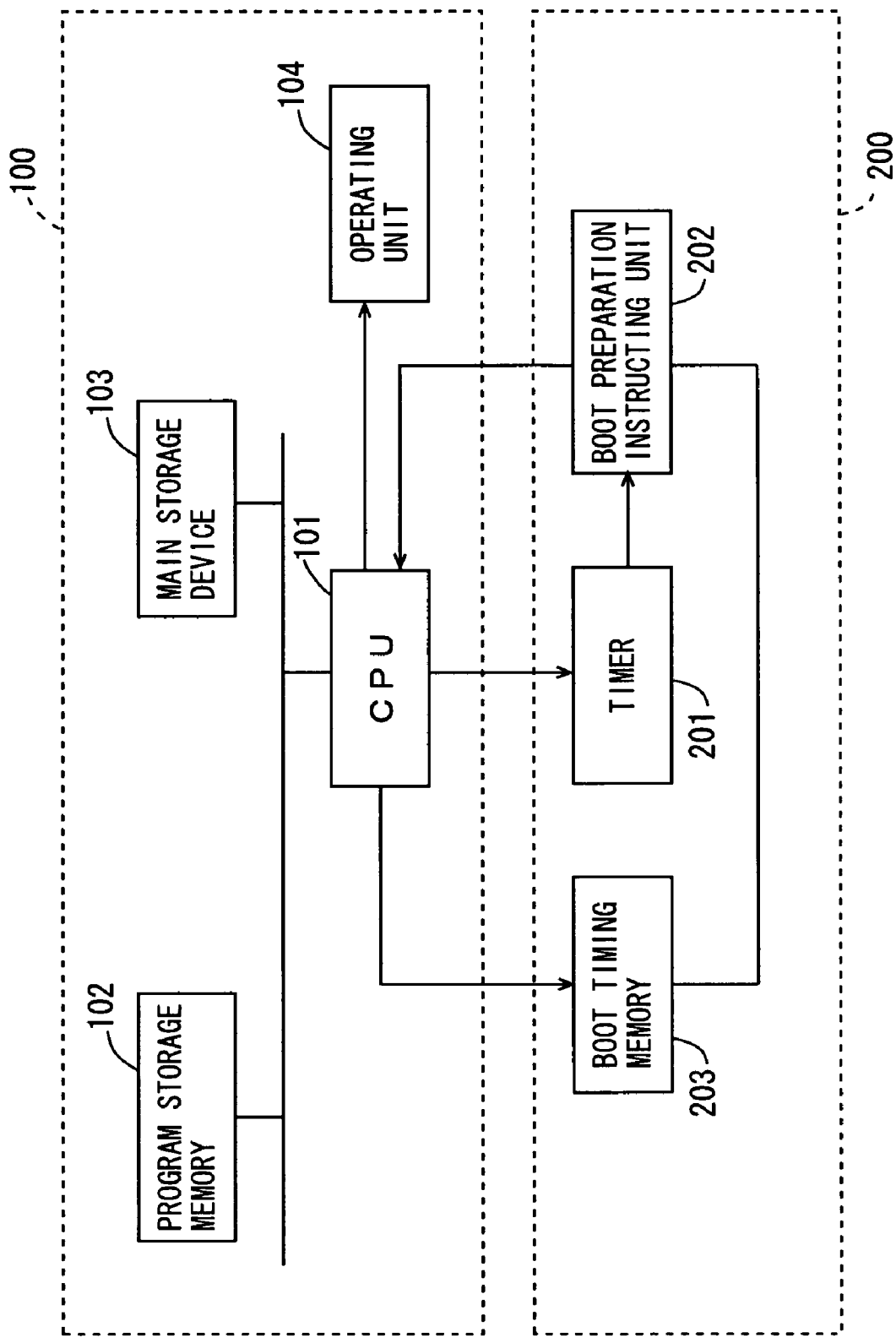
FIG. 3 is a block diagram showing the configuration of an electronic apparatus that includes a boot time reducing device according to a second embodiment of the invention.

FIG. 3 is a block diagram showing the configuration of an electronic apparatus that includes a boot time reducing device according to a second embodiment of the invention.

The electronic apparatus of FIG. 3 is different from the electronic apparatus of FIG. 1 as will now be described. The electronic apparatus of FIG. 3 is not provided with the boot timing instructing unit 300 of FIG. 1. Instead, the boot timing memory 203 stores a previous boot timing for the electronic apparatus. The CPU 101 predicts a boot preparation timing based on the previous boot timing stored in the boot timing memory 203, and stores the predicted boot preparation timing to the boot timing memory 203. More specifically, the CPU 101 decides as a boot preparation timing the timing earlier than the previous boot timing by an amount of time necessary for the boot preparation of the electronic apparatus.

In this embodiment, the CPU 101, timer 201, boot preparation instructing unit 202, and boot timing memory 203 form a boot time reducing device.

Figure 4:
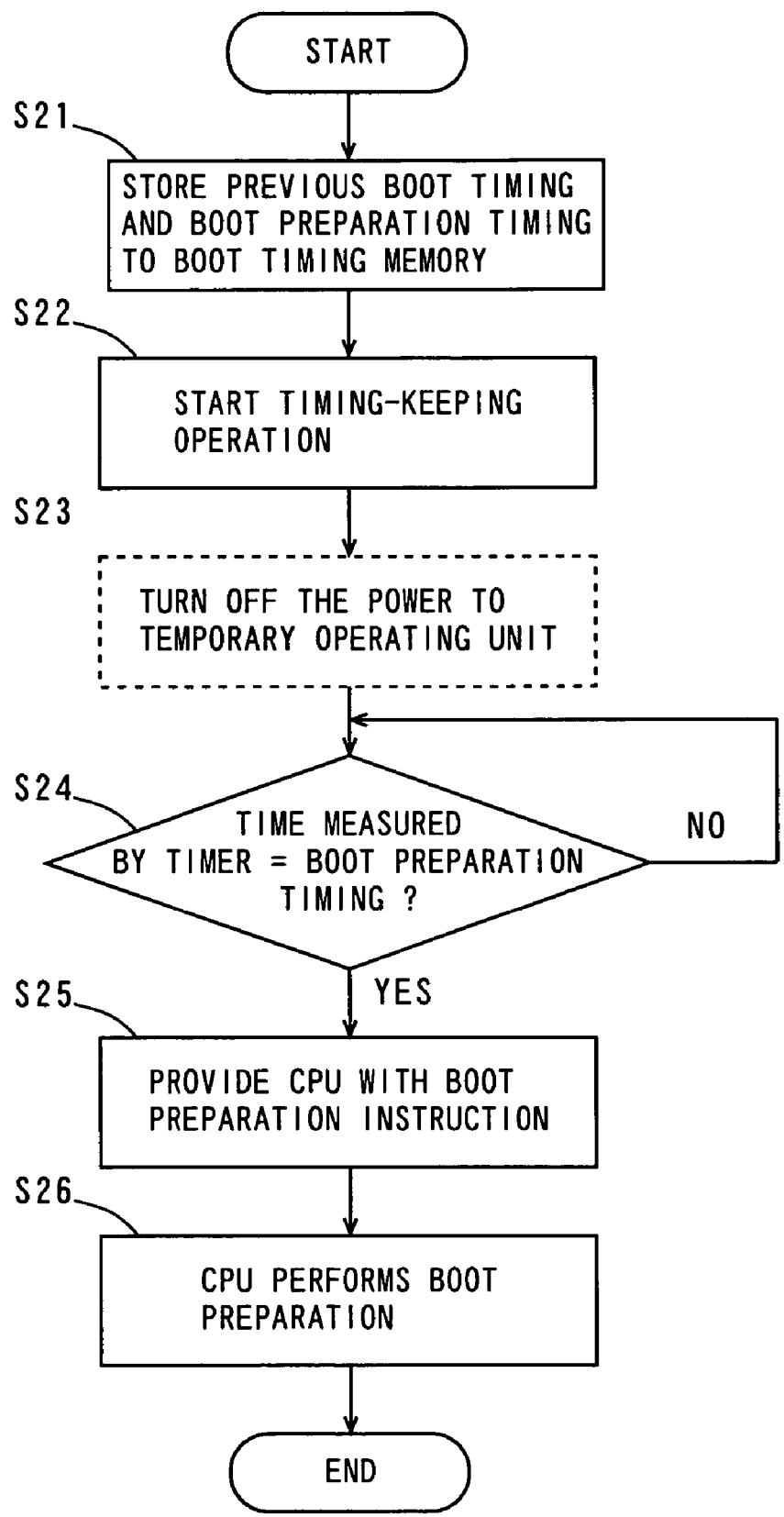
FIG. 4 is a flowchart showing operations of the boot time reducing device in the electronic apparatus of FIG. 3.

FIG. 4 is a flowchart showing operations of the boot time reducing device in the electronic apparatus of FIG. 3.

Operations for storing one boot timing to the boot timing memory 203 will be described first.

The CPU 101 computes a boot preparation timing based on a previous boot timing for the electronic apparatus, and then stores the previous boot timing and obtained boot preparation timing to the boot timing memory 203 (Step S21). At the time, the timer 201 begins a time-keeping operation (Step S22).

After that, the user turns off the power to the temporary operating unit 100 (Step S23). The boot preparation instructing unit 202 determines whether or not the time being measured by the timer 201 coincides with the boot preparation timing stored in the boot timing memory 203 (Step S24).

When the time measured by the timer 201 coincides with the boot preparation timing stored in the boot timing memory 203, the boot preparation instructing unit 202 provides the CPU 101 with a boot preparation instruction (Step S25). This turns on the power to the temporary operating unit 100, and the CPU 101 performs a boot preparation (Step S26).

After the completion of the boot preparation by the CPU 101, the electronic apparatus boots up in response to a user instruction to boot the electronic apparatus using a remote control etc.

The boot time reducing device according to the embodiment allows the generation of a boot instruction to be predicted based on the previous boot timing for the electronic apparatus. In this way, the boot preparation can be started before the electronic apparatus boot timing, resulting in a reduced time between the boot timing and the time that the electronic apparatus becomes usable.

Moreover, the boot preparation timing is automatically determined based on the previous boot timing for the electronic apparatus. This saves the user the trouble of setting the boot preparation timing.

For an electronic apparatus comprising a personal computer and a digital television module, in particular, the boot preparation for the personal computer requiring a long time in booting can be started before the boot timing for the digital television module. This results in a reduced boot time of the electronic apparatus.

In the case where the user does not instruct to boot the electronic apparatus before a specific time elapses after the completion of a boot preparation, the boot preparation is released as will be described below.

Figure 5:
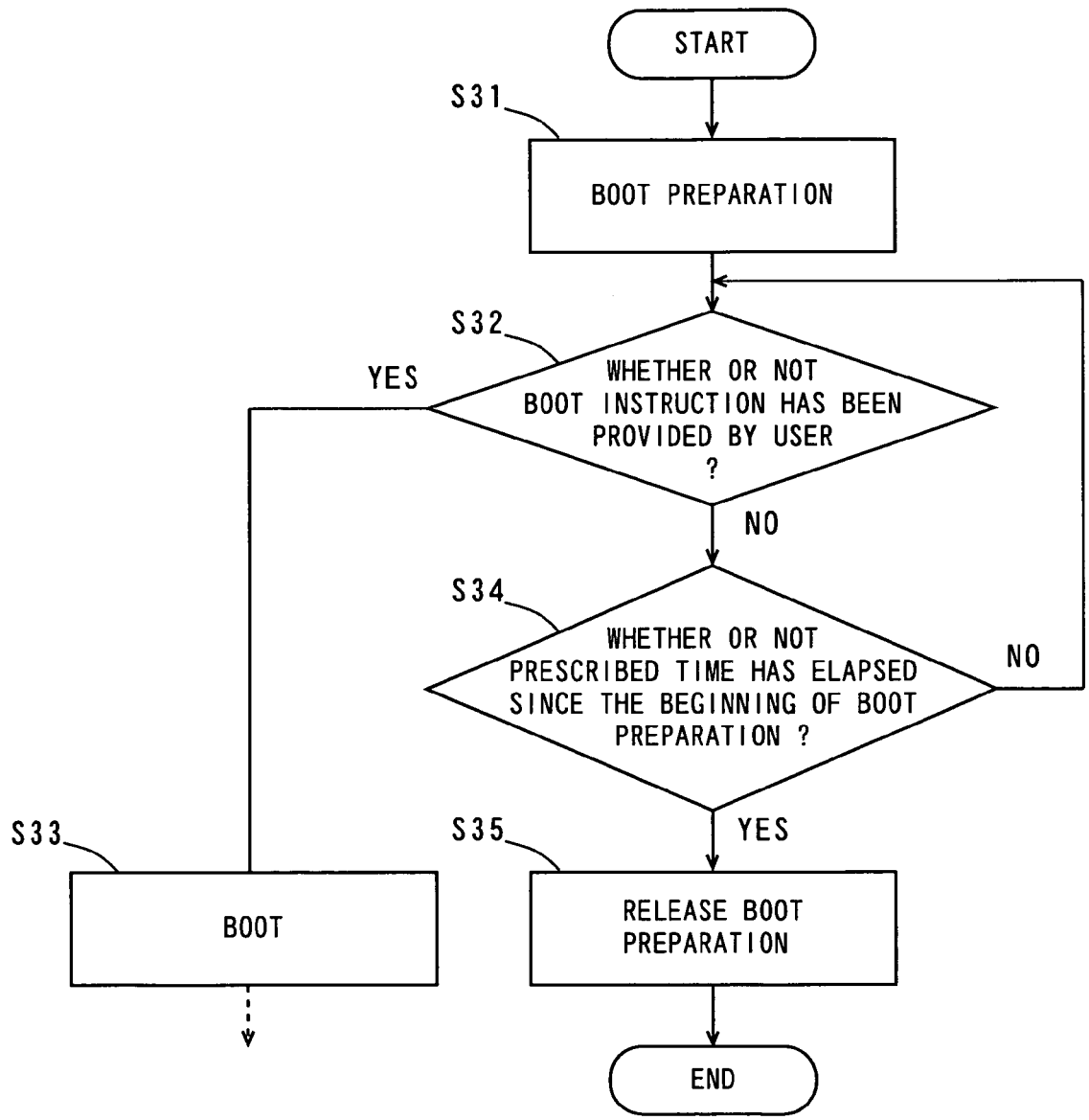
FIG. 5 is a flowchart showing operations for releasing a boot preparation performed by the boot time reducing device in the electronic apparatus of FIG. 3.

FIG. 5 is a flowchart showing operations for releasing the boot preparation performed by the boot time reducing device in the electronic apparatus of FIG. 3.

After performing a boot preparation (Step S31), the CPU 101 determines whether or not a boot instruction has been provided by the user using a remote control etc (Step S32).

When the boot instruction has been provided by the user, the CPU 101 performs a boot process of the temporary operating unit 100 (Step S33). In this case, the boot preparation has already been completed, resulting in a reduced boot time.

When a boot instruction has not been provided by the user, the CPU 101 determines whether or not a prescribed time has elapsed since the beginning of the boot preparation (Step S34).

When a prescribed time has not elapsed since the beginning of the boot preparation, the CPU 101 returns to Step S32. When a prescribed time has elapsed since the beginning of the boot preparation, the CPU 101 releases the boot preparation (Step S35).

As used herein the term releasing the boot preparation refers to e.g. an operation of finishing the program to turn off the temporary operating unit 100.

As described above, if the user does not instruct to boot the electronic apparatus before a specific time elapses after the completion of a boot preparation, the boot preparation is automatically released. This reduces wasted power consumption.

Next, operations for storing a plurality of boot timings to the boot timing memory 203 will be described.

FIG. 6 is a schematic diagram for use in illustrating operations for storing a plurality of boot timings to the boot timing memory 203. The boot timings stored in the boot timing memory 203 and the states of used flags are shown in FIG. 6. In the boot timing memory 203, boot preparation timings are also stored that correspond to the respective boot timings. Each of the used flags indicates how new the corresponding boot timing is; a greater value means that the electronic apparatus was booted at a timing closer to the current time.

Although in this embodiment, three of the boot timings are stored in the boot timing memory 203, any number of boot timings may be stored in the boot timing memory 203.

As shown in FIG. 6(*a*), no boot timings are stored in the boot timing memory 203 during an initial state. As shown in FIG. 6(*b*), when the electronic apparatus is booted at 9 o'clock, "9 o'clock" is stored as a boot timing in the boot timing memory 203, while "3" is assigned to the boot timing "9 o'clock" as a used flag.

Next, as shown in FIG. 6(*c*), when the electronic apparatus is booted at 12 o'clock, "12 o'clock" is additionally stored as a boot timing in the boot timing memory 203, while "3" is assigned to the boot timing "12 o'clock" as a used flag. At this time, the used flag last stored for the boot timing "9 o'clock" is updated to "2".

Then, as shown in FIG. 6(*d*), when the electronic apparatus is booted at 17 o'clock, "17 o'clock" is stored as a boot timing in the boot timing memory 203, while "three " is assigned to the boot timing "17 o'clock" as a used flag. At this time, the used flag for the last stored boot timing "12 o'clock" is updated to "2", and the used flag for the oldest stored boot timing "9 o'clock" is updated to "1".

Next, as shown in FIG. 6(*e*), when the electronic apparatus is booted at 12 o'clock, the boot timing "12 o'clock" stored in the boot timing memory 203 remains the same since it is already stored in the boot timing memory 203. Meanwhile, the used flag for the boot timing "12 o'clock" is updated to "3", and the used flag for the boot timing "17 o'clock" is updated to "2".

After this, as shown in FIG. 6(*f*), when the electronic apparatus is booted at 15 o'clock, the oldest boot timing "9 o'clock" is replaced by the boot timing "15 o'clock", while the boot timing "15 o'clock" is assigned a used flag "3". At this time, the used flag for the last stored boot timing "12 o'clock" is updated to "2", and the used flag for the boot timing "17 o'clock" stored before the last time is updated to "1".

In this way, boot timings are sequentially stored to the boot timing memory 203. Simultaneously, the latest boot timing is assigned a used flag with a maximal value, and the oldest boot timing is assigned a used flag with a minimal value. Each time the electronic apparatus is booted, the boot timing with the minimal value used flag is updated with a new boot timing. This allows a boot preparation timing to be predicted always based on a plurality of latest boot timings.

In the case where boot timings vary by the minute according to the user convenience, the boot timings may be stored ignoring the figures below the first place of the minute.

For example, if the user boots the electronic apparatus at 9:52 and at 9:59, "9:50" is stored in the boot timing memory 203 as a boot timing. Assuming that the time required for a boot preparation is ten minutes, the boot preparation timing is set at 9:40. In this case, it is necessary to set the time from the boot preparation to boot preparation release longer than ten minutes.

In this embodiment, the CPU 101 corresponds to a controller and a processing device; the boot timing memory 203 corresponds to a storage device; and the program storage memory 102 corresponds to a program storage device.

Third Embodiment

Figure 7:
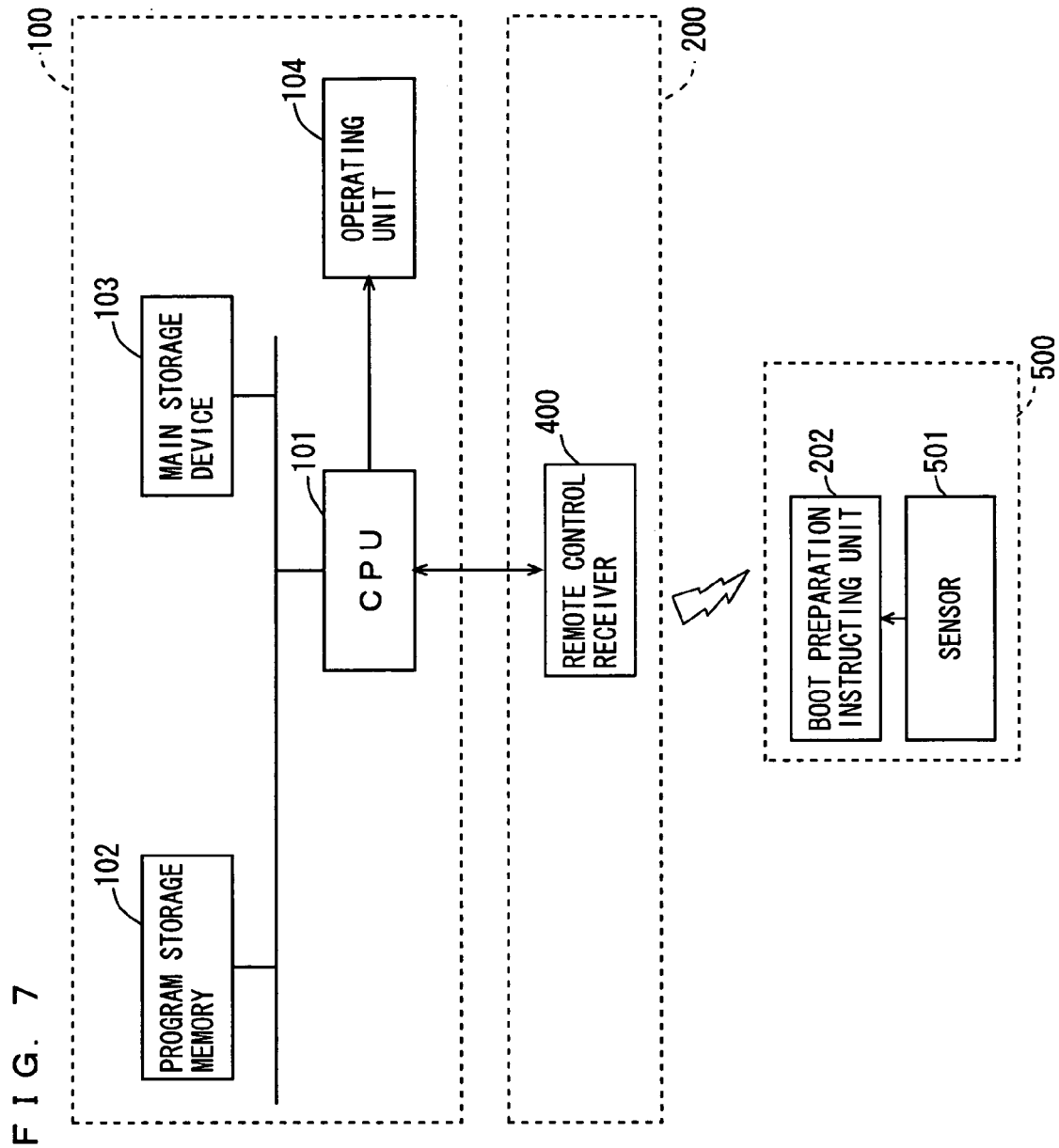
FIG. 7 is a block diagram showing the configuration of an electronic apparatus that includes a boot time reducing device according to a third embodiment.

FIG. 7 is a block diagram showing the configuration of an electronic apparatus that includes a boot time reducing device according to a third embodiment.

The electronic apparatus of FIG. 7 is different from the electronic apparatus of FIG. 3 as will now be described. The electronic apparatus of FIG. 7 has a remote control receiver 400 incorporated in the normally operating unit 200. A remote control 500 includes a boot preparation instructing unit 202 and a sensor 501.

The sensor 501 is composed of a pressure sensor that detects a pressure, a temperature sensor that detects a temperature, or a gyrosensor that detects an angular velocity, for example. The pressure sensor as the sensor 501 detects a pressure generated when the user holds the remote control 500, and outputs a signal indicative of the pressure to the boot preparation instructing unit 202. The temperature sensor as the sensor 501 detects a temperature of the remote control 500 that has increased by the user temperature, and outputs a signal indicative of the temperature to the boot preparation instructing unit 202. The gyrosensor as the sensor 501 detects an angular velocity due to spatial movement of the remote control 500, and outputs a signal indicative of the angular velocity to the boot preparation instructing unit 202.

The sensor 501 may include other sensors that detect the user touching the remote control 500. The sensor 501 may include a laser sensor, an ultrasonic sensor, a magnetic sensor or an infrared sensor, for example.

The boot preparation instructing unit 202 transmits a boot preparation instruction to the remote control receiver 400 in the normally operating unit 200 based on the signal outputted from the sensor 501. The boot preparation instructing unit 202 is composed of a microcomputer and a transmission circuit, for example. The pressure sensor as the sensor 501 determines, when the pressure detected by the sensor 501 has increased, that the user has touched the remote control 500, and transmits a boot preparation instruction. The temperature sensor 501 as the sensor 501 determines, when the temperature detected by the sensor 501 has increased, that the user has touched the remote control 500, and transmits a boot preparation instruction. The gyrosensor as the sensor 501 determines, when the angular velocity detected by the sensor 501 has increased, that the user has moved the remote control 500, and transmits a boot preparation instruction.

The remote control receiver 400 has a function of receiving general signals from the remote control 500 for the user to instruct the operation of the electronic apparatus. In addition to that, the remote control receiver 400 receives the boot preparation instruction transmitted from the boot preparation instructing unit 202, and provides the CPU 101 with the boot preparation instruction.

In this embodiment, the CPU 101, remote control receiver 400, boot preparation instructing unit 202, and sensor 500 form a boot time reducing device.

Figure 8:
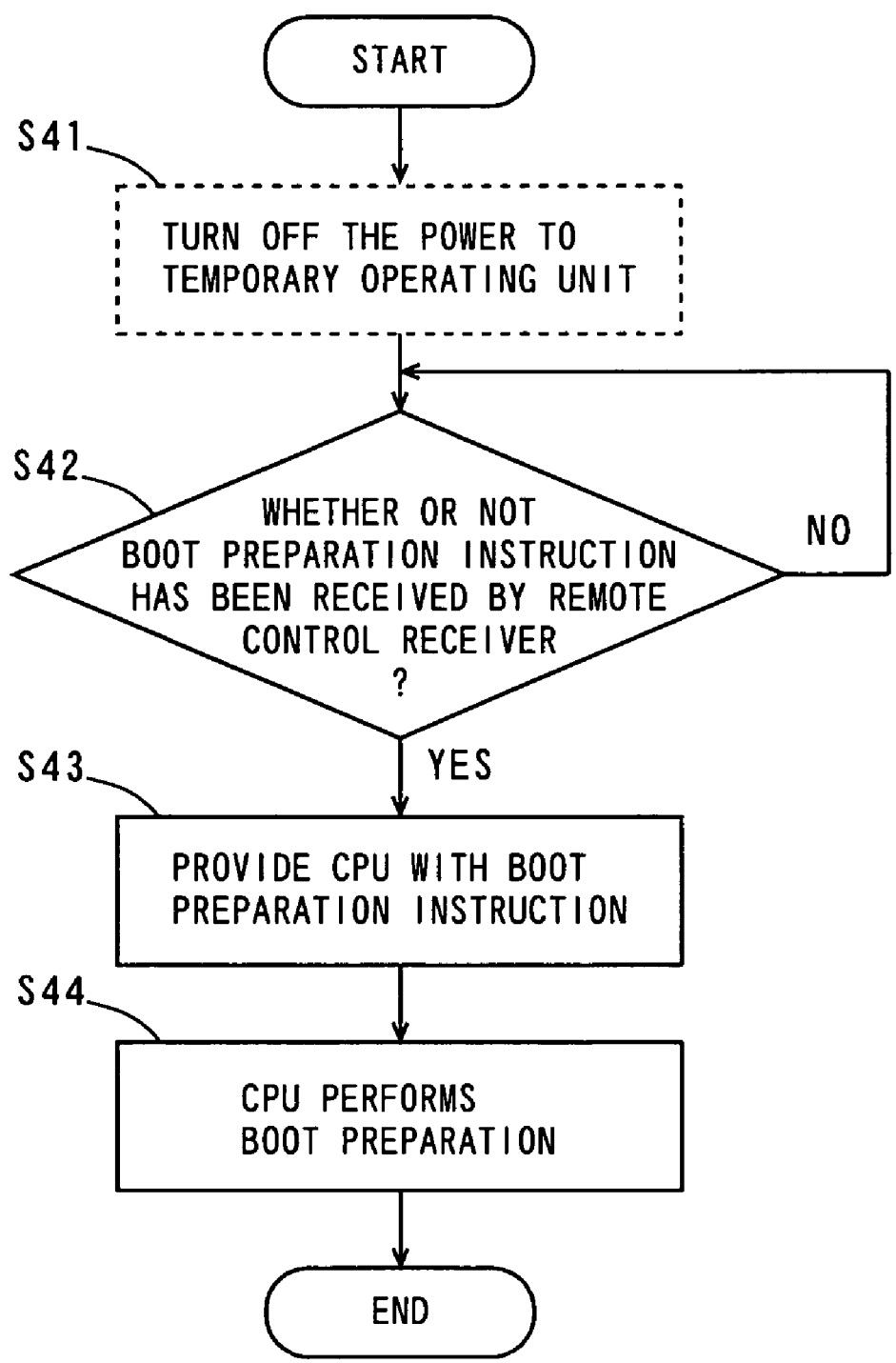
FIG. 8 is a flowchart showing operations of the boot time reducing device in the electronic apparatus of FIG. 7.

FIG. 8 is a flowchart showing operations of the boot time reducing device in the electronic apparatus of FIG. 7.

The user first turns off the power to the temporary operating unit 100 (Step S41). After that, the remote control receiver 400 determines whether or not a boot preparation instruction has been received from the boot preparation instructing unit 202 (Step S42).

When the remote control receiver 400 has received the boot preparation instruction, the remote control receiver 400 provides the CPU 101 with the boot preparation instruction (Step S43). This turns on the power to the temporary operating unit 100, and the CPU 101 performs a boot preparation (Step S44).

After the completion of the boot preparation by the CPU 101, the electronic apparatus boots up in response to a user instruction to boot the electronic apparatus using the remote control 500.

The boot time reducing device according to the embodiment allows the generation of a boot instruction to be predicted by detecting the user touching the remote control 500. In this way, the boot preparation can be started before the electronic apparatus boot timing, resulting in a reduced time between the boot timing and the time that the electronic apparatus becomes usable.

For an electronic apparatus comprising a personal computer and a digital television module, in particular, the boot preparation for the personal computer requiring a long time in booting can be started before the boot timing for the digital television module. This results in a reduced boot time of the electronic apparatus.

In the case where the user does not instruct to boot the electronic apparatus before a specific time elapses after the completion of a boot preparation, the boot preparation is released as in the second embodiment.

In this embodiment, the CPU 101 corresponds to a controller and a processing device; the remote control 500 corresponds to a manipulation device; the sensor 501 corresponds to a predictor; the boot preparation instructing unit 202 corresponds to an instruction generator; and the program storage memory 102 corresponds to a program storage device.

Fourth Embodiment

Figure 9:
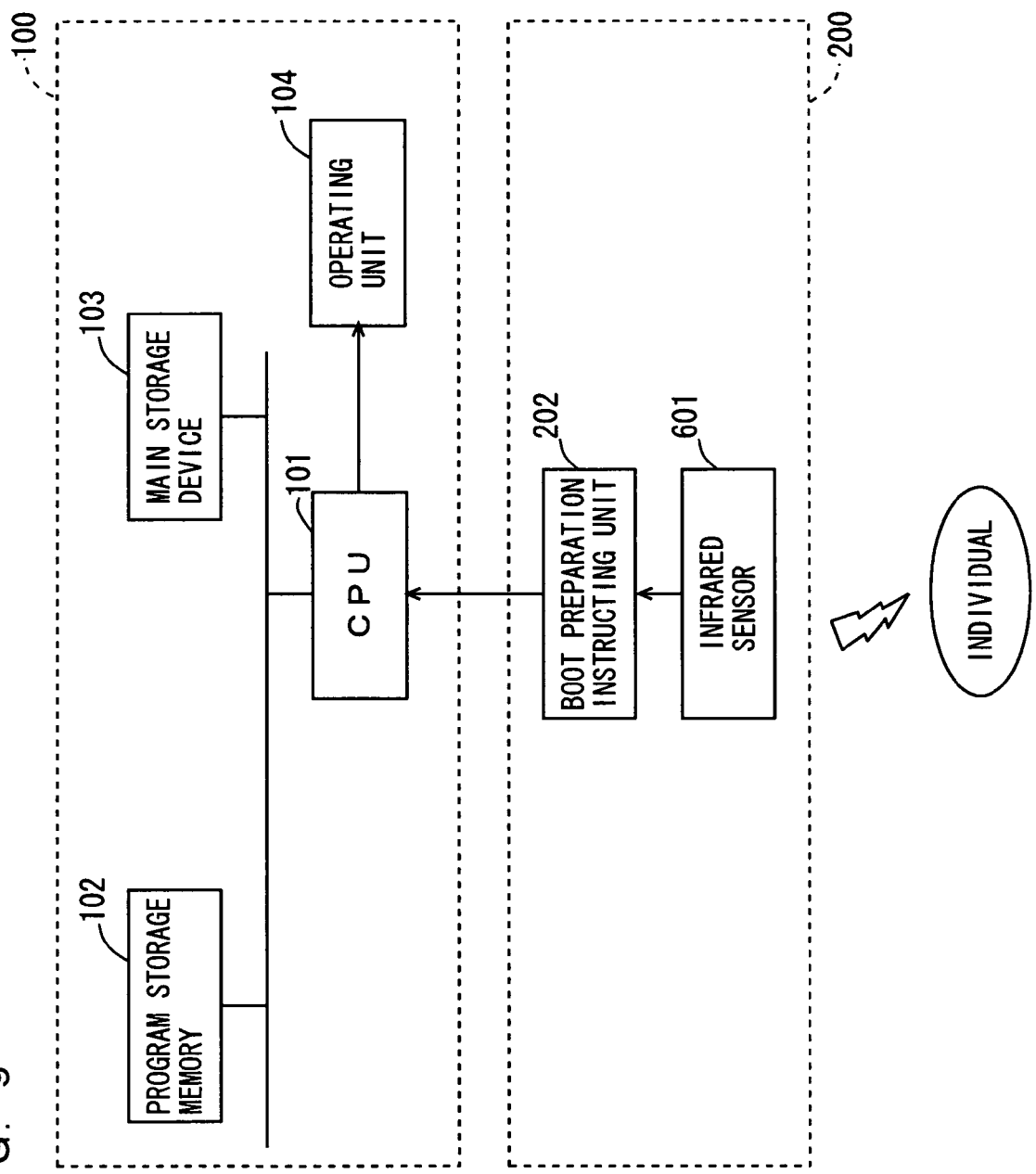
FIG. 9 is a block diagram showing the configuration of an electronic apparatus that includes a boot time reducing device according to a fourth embodiment of the invention.

FIG. 9 is a block diagram showing the configuration of an electronic apparatus that includes a boot time reducing device according to a fourth embodiment of the invention.

The electronic apparatus of FIG. 9 is different from the electronic apparatus of FIG. 7 as will now be described. The electronic apparatus of FIG. 9 has a boot preparation instructing unit 202 and an infrared sensor 601 incorporated in the normally operating unit 200.

The infrared sensor 601 detects the presence or approach of the user in the vicinity of the electronic apparatus using infrared radiation. When the infrared sensor 601 has detected the presence or approach of the user, the boot preparation instructing unit 202 provides a boot preparation instruction to the CPU 101 in the temporary operating unit 100.

In this embodiment, the CPU 101, boot preparation instructing unit 202, and infrared sensor 601 form a boot time reducing device.

Figure 10:
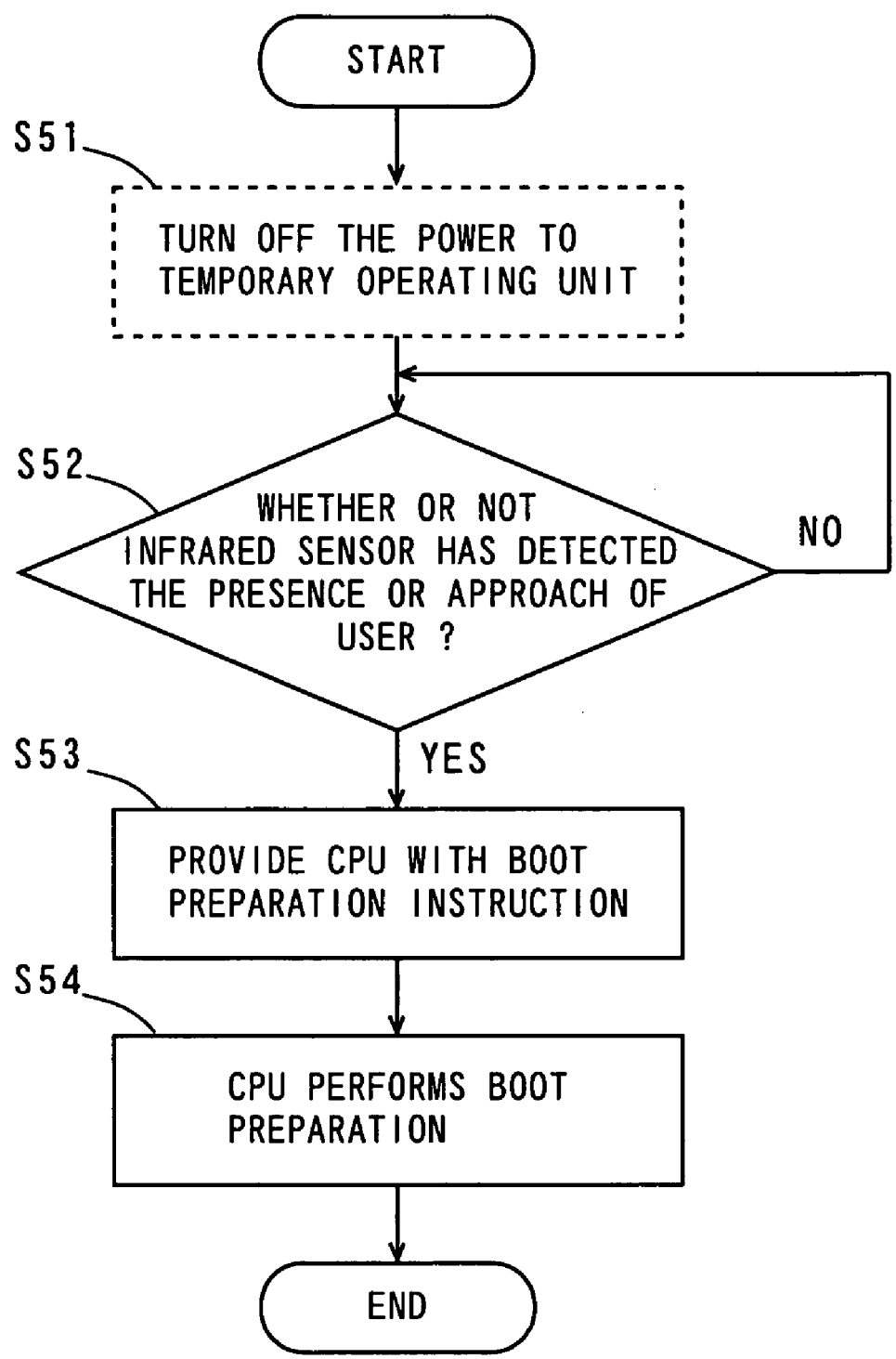
FIG. 10 is a flowchart showing operations of the boot time reducing device of the electronic apparatus of FIG. 9.

FIG. 10 is a flowchart showing operations of the boot time reducing device of the electronic apparatus of FIG. 9.

The user first turns off the power to the temporary operating unit 100 (Step S51). After that, the boot preparation instructing unit 202 determines whether or not the infrared sensor 601 has detected the presence or approach of the user (Step S52).

When the infrared sensor 601 has detected the presence or approach of the user, the boot preparation instructing unit 202 provides the CPU 101 with a boot preparation instruction (Step S53). This turns on the power to the temporary operating unit 100, and the CPU 101 performs a boot preparation (Step S54).

After the completion of the boot preparation by the CPU 101, the electronic apparatus boots up in response to a user instruction to boot the electronic apparatus using a remote control etc.

The boot time reducing device according to the embodiment allows the generation of a boot instruction to be predicted by detecting the presence or approach of the user in the vicinity of the electronic apparatus using infrared radiation. In this way, the boot preparation can be started before the electronic apparatus boot timing, resulting in a reduced time between the boot timing and the time that the electronic apparatus becomes usable.

For an electronic apparatus comprising a personal computer and a digital television module, in particular, the boot preparation for the personal computer requiring a long time in booting can be started before the boot timing for the digital television module. This results in a reduced boot time of the electronic apparatus.

In the case where the user does not instruct to boot the electronic apparatus before a specific time elapses after the completion of a boot preparation, the boot preparation is released as in the second embodiment.

In this embodiment, the CPU 101 corresponds to a controller and a processing device; the infrared sensor 601 corresponds to a sensor; the boot preparation instructing unit 202 corresponds to an instruction generator; and the program storage memory 102 corresponds to a program storage device.

Fifth Embodiment

Figure 11:
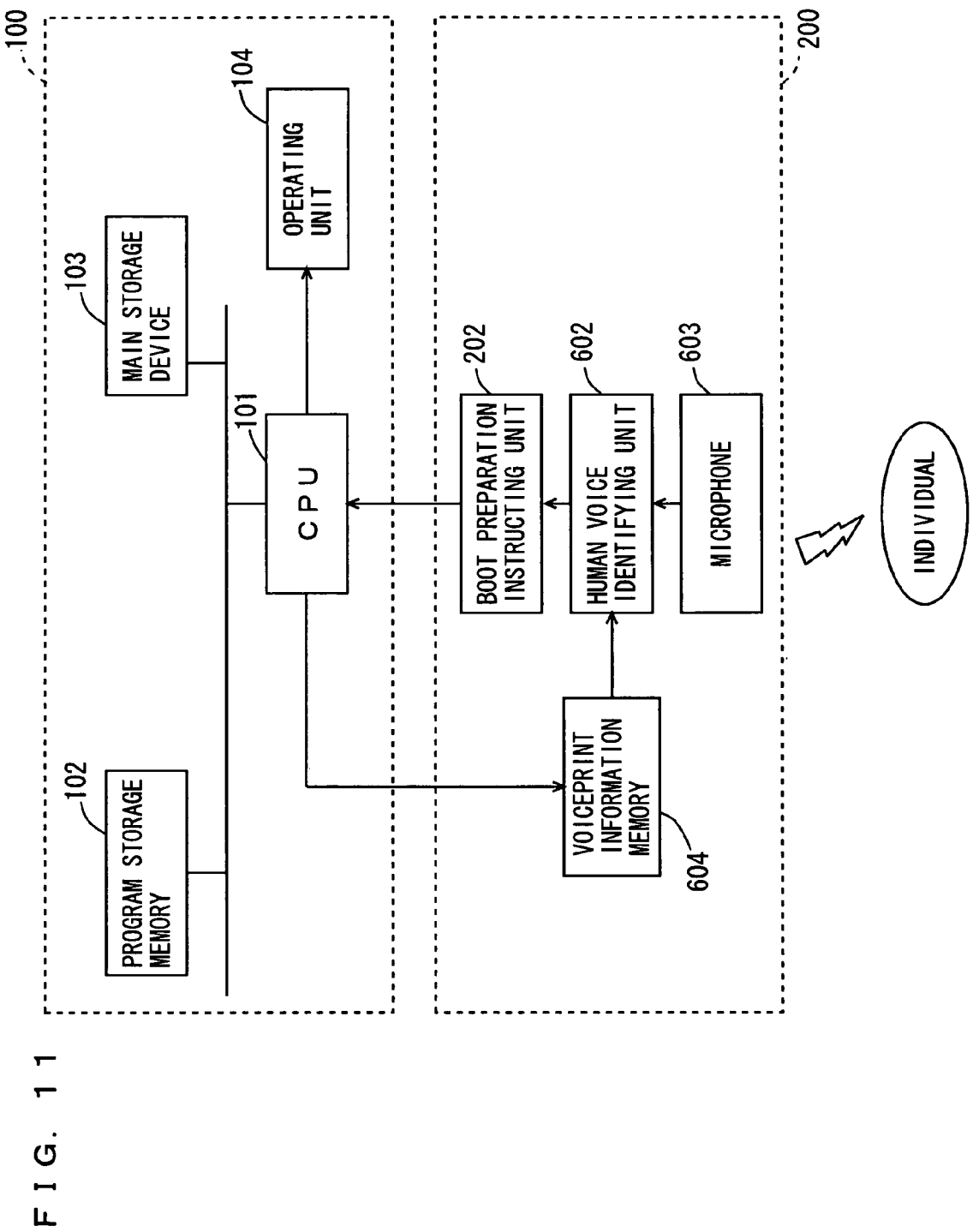
FIG. 11 is a block diagram showing the configuration of an electronic apparatus that includes a boot time reducing device according to a fifth embodiment of the invention.

FIG. 11 is a block diagram showing the configuration of an electronic apparatus that includes a boot time reducing device according to a fifth embodiment of the invention.

The electronic apparatus of FIG. 11 is different from the electronic apparatus of FIG. 9 as will now be described. The normally operating unit 200 includes a boot preparation instructing unit 202, a human voice identifying unit 602, a microphone 603, and a voiceprint information memory 604.

The microphone 603 inputs a voice generated in the vicinity of the electronic apparatus as voice data to the human voice identifying unit 602. The voiceprint information memory 604 stores information on the voice print of a registered person (which will hereinafter be referred to as voiceprint information). The human voice identifying unit 602 compares the voice data inputted from the microphone 603 with the voiceprint information stored in the voiceprint information memory 604, thereby detecting the presence or approach of the registered person.

When the human voice identifying unit 602 has detected the presence or approach of the registered person, the boot preparation instructing unit 202 provides a boot preparation instruction to the CPU 101 in the temporary operating unit 100.

In this embodiment, the CPU 101, boot preparation instructing unit 202, microphone 603, human voice identifying unit 602, and voiceprint information memory 604 form a boot time reducing device.

Figure 12:
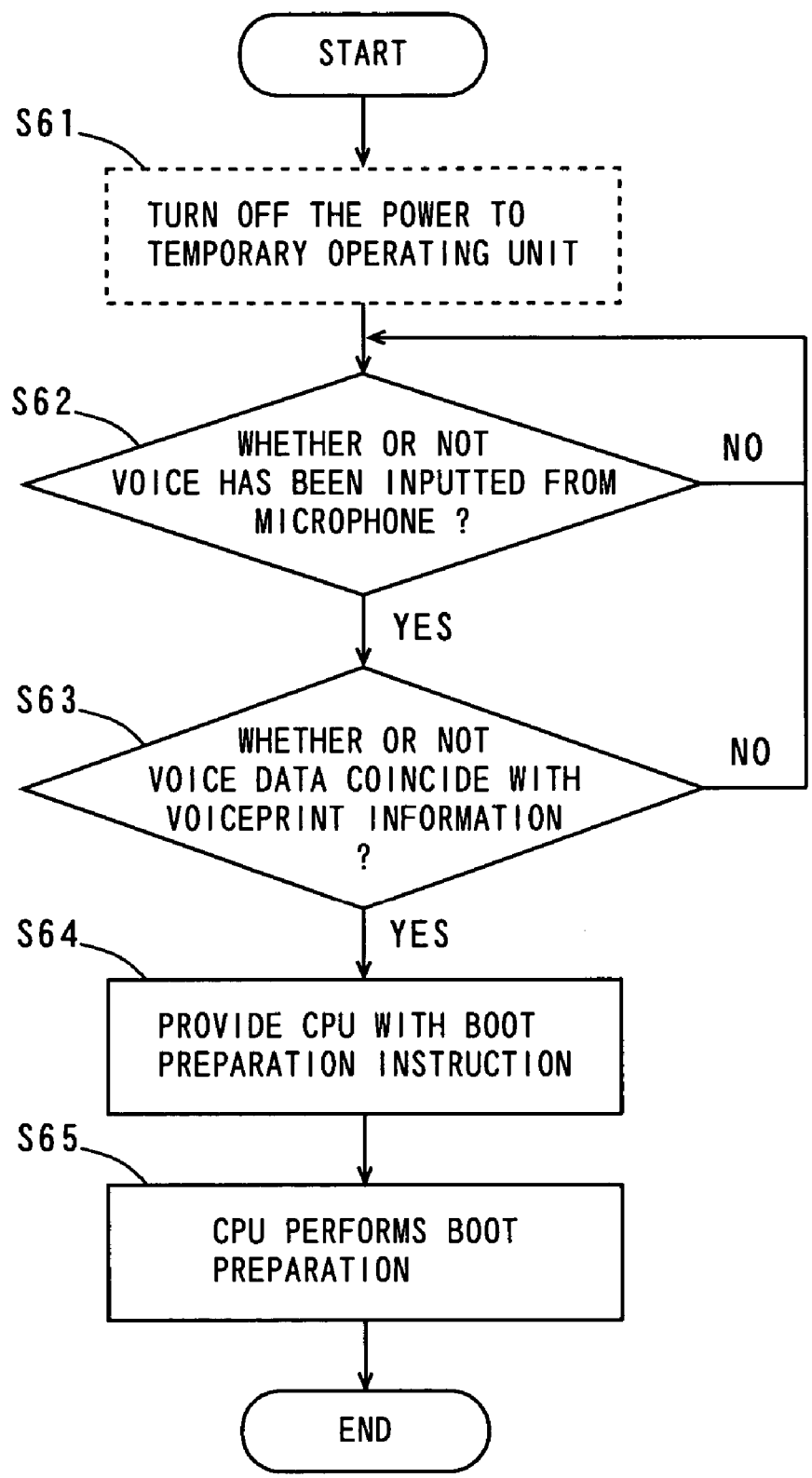
FIG. 12 is a flowchart showing operations of the boot time reducing device in the electronic apparatus of FIG. 11.

FIG. 12 is a flowchart showing operations of the boot time reducing device in the electronic apparatus of FIG. 11.

The user first turns off the power to the temporary operating unit 100 (Step S61). After that, the human voice identifying unit 602 determines whether or not a voice has been inputted from the microphone 603 as voice data (Step S62).

When the human voice identifying unit 602 has received input of the voice as voice data from the microphone 603, the human voice identifying unit 602 determines whether or not the voice data inputted from the microphone 603 coincides with the voiceprint information stored in the voiceprint information memory 604 (Step S63).

When the voice data inputted from the microphone 603 coincides with the voiceprint information stored in the voiceprint information memory 604, the boot preparation instructing unit 202 provides the CPU 101 with a boot preparation instruction (Step S64). This turns on the power to the temporary operating unit 100, and the CPU 101 performs a boot preparation (Step S65).

After the completion of the boot preparation by the CPU 101, the electronic apparatus boots up in response to a user instruction to boot the electronic apparatus using a remote control etc.

The boot time reducing device according to the embodiment allows the generation of a boot instruction to be predicted by detecting the presence or approach of the registered user in the vicinity of the electronic apparatus based on voice. In this way, the boot preparation can be started before the electronic apparatus boot timing, resulting in a reduced time between the boot timing and the time that the electronic apparatus becomes usable.

For an electronic apparatus comprising a personal computer and a digital television module, in particular, the boot preparation for the personal computer requiring a long time in booting can be started before the boot timing for the digital television module. This results in a reduced boot time of the electronic apparatus.

In the case where the user does not instruct to boot the electronic apparatus before a specific time elapses after the completion of a boot preparation, the boot preparation is released as in the second embodiment.

In this embodiment, the CPU 101 corresponds to a controller and a processing device; the microphone 603 corresponds to a sensor or a voice input device; the voiceprint information memory 604 corresponds to a storage device; the human voice identifying unit 602 corresponds to a determiner; the boot preparation instructing unit 202 corresponds to an instruction generator; and the program storage memory 102 corresponds to a program storage device.

Sixth Embodiment

Figure 13:
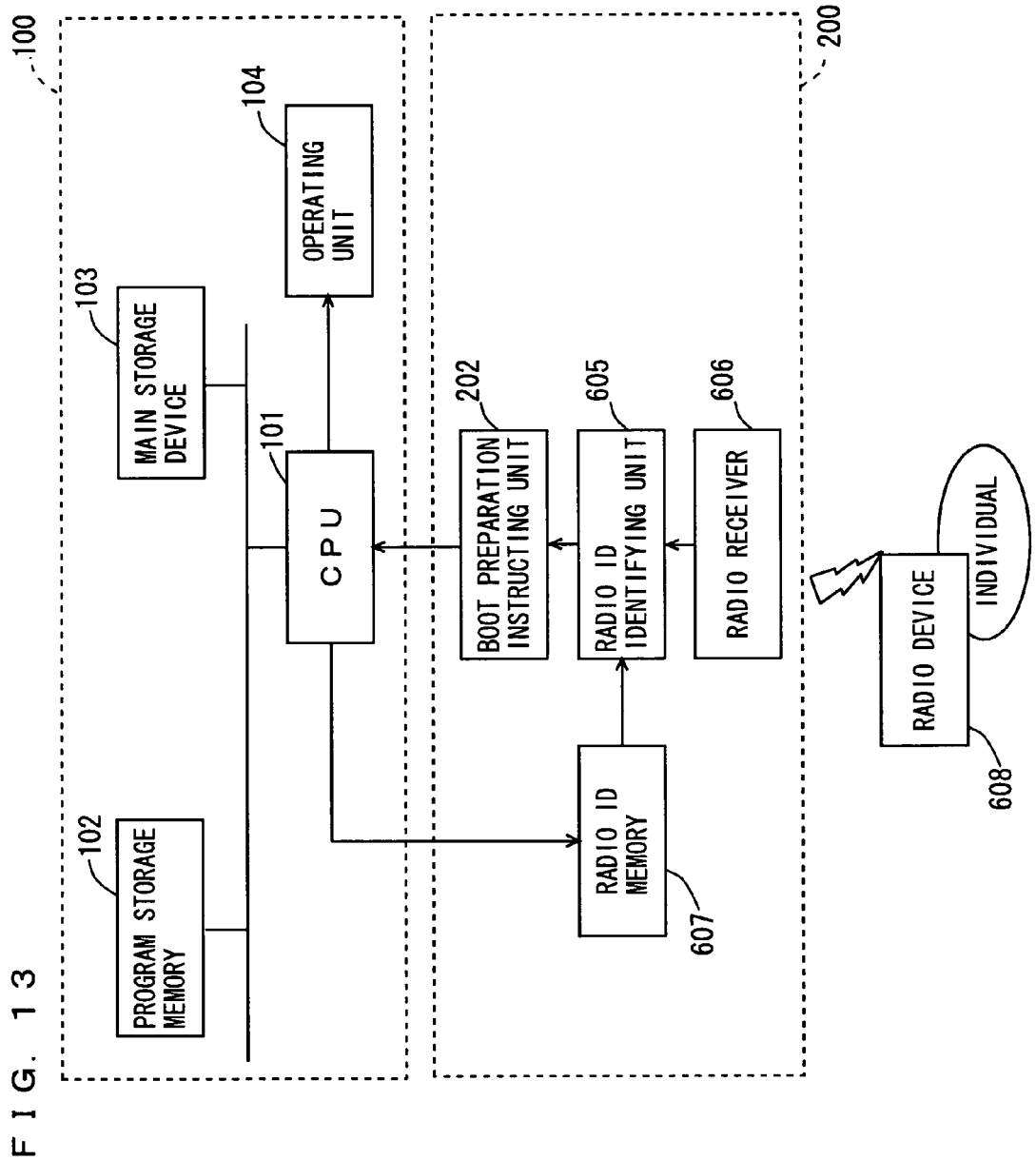
FIG. 13 is a block diagram showing the configuration of an electronic apparatus that includes a boot time reducing device according to a sixth embodiment of the invention.

FIG. 13 is a block diagram showing the configuration of an electronic apparatus that includes a boot time reducing device according to a sixth embodiment of the invention.

The electronic apparatus of FIG. 13 is different from the electronic apparatus of FIG. 11 as will now be described. The normally operating unit 200 includes a boot preparation instructing unit 202, a radio ID (identifier) identifying unit 605, a radio receiver 606, and a radio ID memory 607.

A registered radio device 608 transmits a radio signal that contains an ID (identifier) for identifying the radio device 608. The radio device 608 is composed of a cellular phone or radio equipment compatible with the Bluetooth (trademark) standard, for example.

The radio receiver 606 receives the radio signal generated by the radio device 600. The radio ID memory 607 stores the ID of the registered radio device 608.

The radio ID identifying unit 605 compares the ID contained in the radio signal that has been received via the radio receiver 606 with the ID stored in the radio ID memory 607, thereby detecting the presence or approach of the registered radio-device 608. When the radio ID identifying unit 605 has detected the presence or approach of the registered radio device 608, the boot preparation instructing unit 202 provides a boot preparation instruction to the CPU 101 in the temporary operating unit 100.

In this embodiment, the CPU 101, boot preparation instructing unit 202, radio ID identifying unit 605, radio receiver 606, and radio ID memory 607 form a boot time reducing device.

Figure 14:
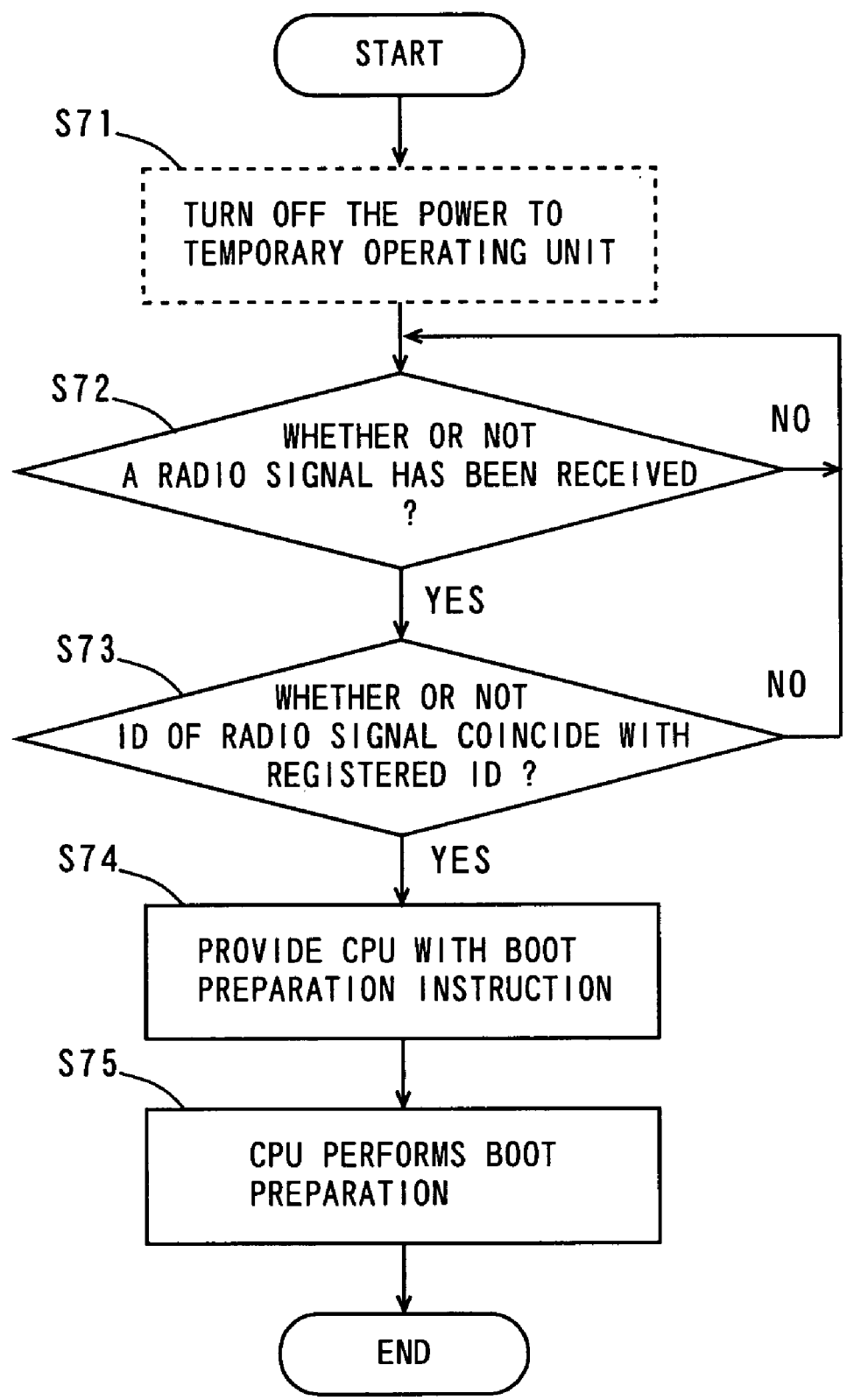
FIG. 14 is a flowchart showing operations of the boot time reducing device in the electronic apparatus of FIG. 13.

FIG. 14 is a flowchart showing operations of the boot time reducing device in the electronic apparatus of FIG. 13.

The user first turns off the power to the temporary operating unit 100 (Step S71). After that, the radio ID identifying unit 605 determines whether or not the radio receiver 606 has received a radio signal (Step S72).

When the radio receiver 606 has received a radio signal, the radio ID identifying unit 605 determines whether or not the ID of the radio signal coincides with the registered ID stored in the radio ID memory 607 (Step S73).

When the ID of the radio signal which has been received by the radio receiver 606 coincides with the registered ID in the radio ID memory 607, the boot preparation instructing unit 202 provides the CPU 101 with a boot preparation instruction (Step S74). This turns on the power to the temporary operating unit 100, and the CPU 101 performs a boot preparation (Step S75).

After the completion of the boot preparation by the CPU 101, the electronic apparatus boots up in response to a user instruction to boot the electronic apparatus using a remote control etc.

The boot time reducing device according to the embodiment allows the generation of a boot instruction to be predicted by detecting the presence or approach of the user in the vicinity of the electronic apparatus based on an ID from the registered radio device 608. In this way, the boot preparation can be started before the electronic apparatus boot timing, resulting in a reduced time between the boot timing and the time that the electronic apparatus becomes usable.

For an electronic apparatus comprising a personal computer and a digital television module, in particular, the boot preparation for the personal computer requiring a long time in booting can be started before the boot timing for the digital television module. This results in a reduced boot time of the electronic apparatus.

In the case where the user does not instruct to boot the electronic apparatus before a specific time elapses after the completion of a boot preparation, the boot preparation is released as in the second embodiment.

In this embodiment, the CPU 101 corresponds to a controller and a processing device; the radio receiver 606 corresponds to a sensor or a receiver; the radio ID memory 607 corresponds to a storage device; the radio ID identifying unit 605 corresponds to a determiner; the boot preparation instructing unit 202 corresponds to an instruction generator; and the program storage memory 102 corresponds to a program storage device.

Seventh Embodiment

Figure 15:
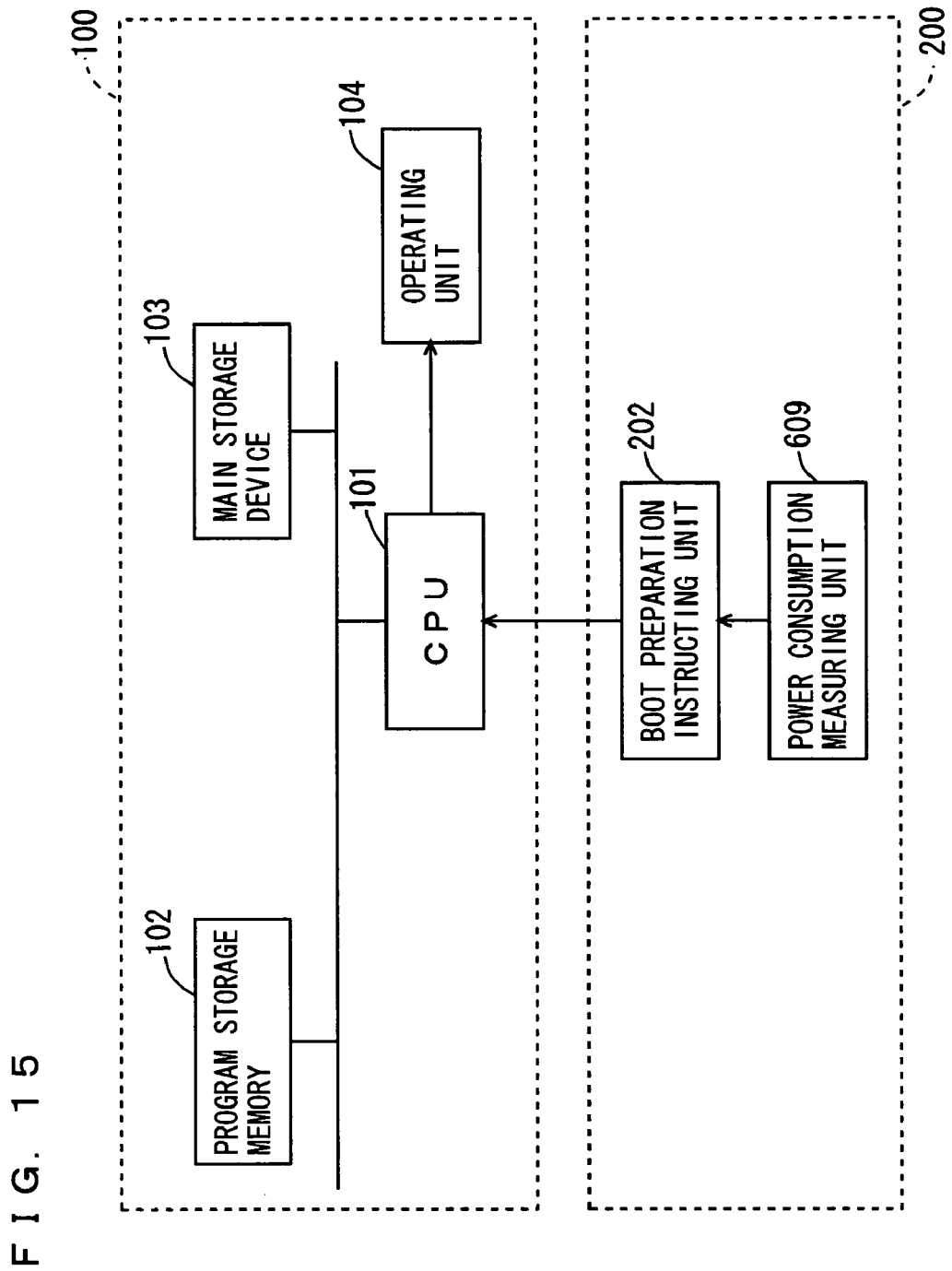
FIG. 15 is a block diagram showing the configuration of an electronic apparatus that includes a boot time reducing device according to a seventh embodiment of the invention.

FIG. 15 is a block diagram showing the configuration of an electronic apparatus that includes a boot time reducing device according to a seventh embodiment of the invention.

The electronic apparatus of FIG. 15 is different from the electronic apparatus of FIG. 13 as will now be described. The normally operating unit 200 includes a boot preparation instructing unit 202 and a power consumption measuring unit 609.

The present electronic apparatus enables communication using a power line. The power consumption measuring unit 609 can obtain information on an amount of power consumption through communication with a power supply using a power line.

The boot preparation instructing unit 202 detects the presence of a person based on a variation in the power consumption measured by the power consumption measuring unit 609. In other words, the boot preparation instructing unit 202 detects the presence of a person by assuming, with an increase in the power consumption measured by the power consumption measuring unit 609, that the person is present, and provides a boot preparation instruction to the CPU 101 in the temporary operating unit 100.

In this embodiment, the CPU 101, boot preparation instructing unit 202, and power consumption measuring unit 609 form a boot time reducing device.

Figure 16:
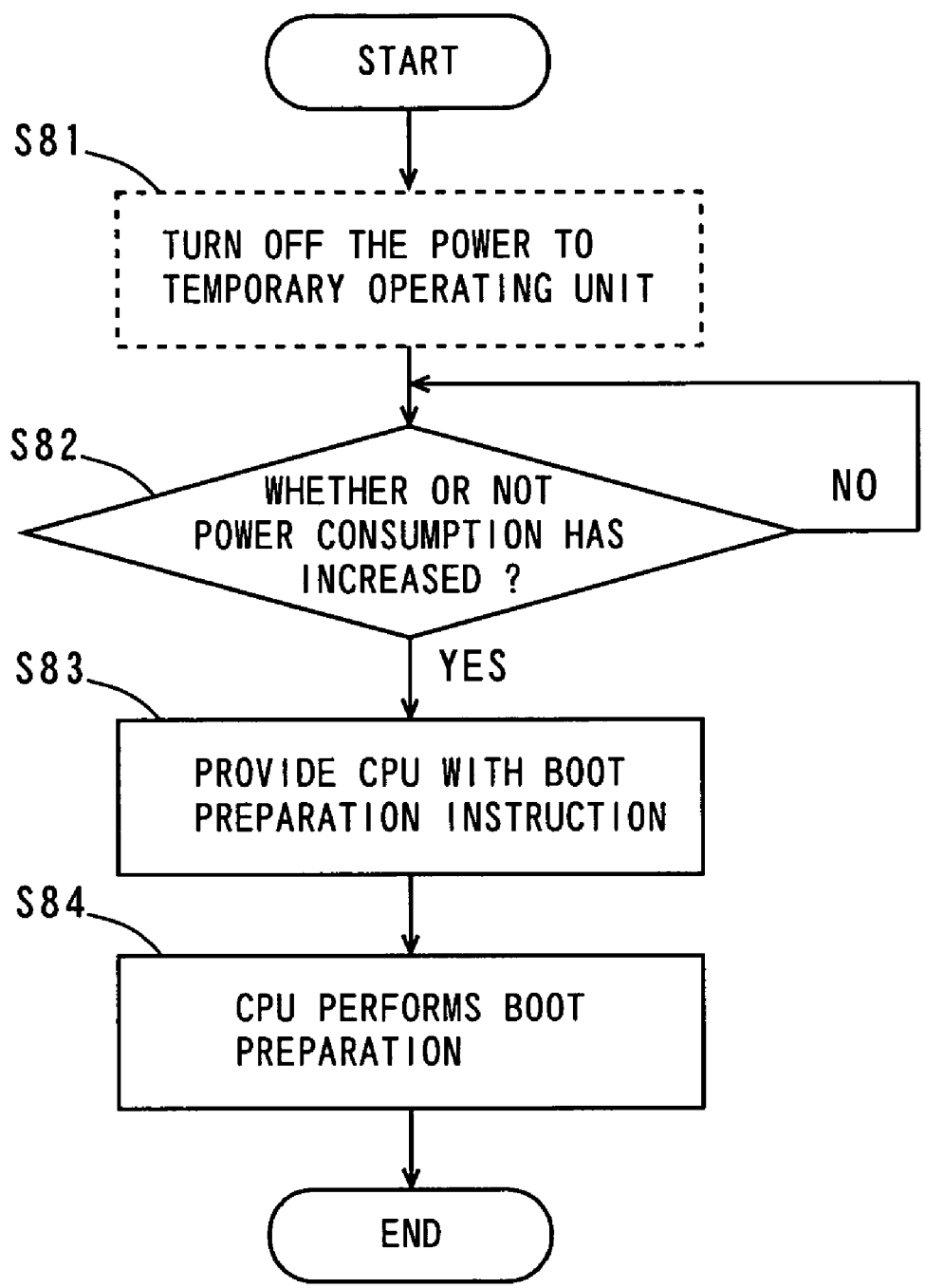
FIG. 16 is a flowchart showing operations of the boot time reducing device in the electronic apparatus of FIG. 15.

FIG. 16 is a flowchart showing operations of the boot time reducing device in the electronic apparatus of FIG. 15.

The user first turns off the power to the temporary operating unit 100 (Step S81). After that, the boot preparation instructing unit 202 determines whether or not the power consumption measured by the power consumption measuring unit 609 has increased (Step S82).

When the power consumption has increased, the boot preparation instructing unit 202 provides the CPU 101 with a boot preparation instruction (Step S83). This turns on the power to the temporary operating unit 100, and the CPU 101 performs a boot preparation (Step S84).

After the completion of the boot preparation by the CPU 101, the electronic apparatus boots up in response to a user instruction to boot the electronic apparatus using a remote control etc.

The boot time reducing device according to the embodiment allows the generation of a boot instruction to be predicted by detecting the presence of the user in the vicinity of the electronic apparatus based on an increase in the power consumption. In this way, the boot preparation can be started before the electronic apparatus boot timing, resulting in a reduced time between the boot timing and the time that the electronic apparatus becomes usable.

For an electronic apparatus comprising a personal computer and a digital television module, in particular, the boot preparation for the personal computer requiring a long time in booting can be started before the boot timing for the digital television module. This results in a reduced boot time of the electronic apparatus.

In the case where the user does not instruct to boot the electronic apparatus before a specific time elapses after the completion of a boot preparation, the boot preparation is released as in the second embodiment.

In this embodiment, the CPU 101 corresponds to a controller and a processing device; the power consumption measuring unit 600 corresponds to a sensor or a power measuring device; the boot preparation instructing unit 202 corresponds to an instruction generator; and the program storage memory 102 corresponds to a program storage device.

Eighth Embodiment

Figure 17:
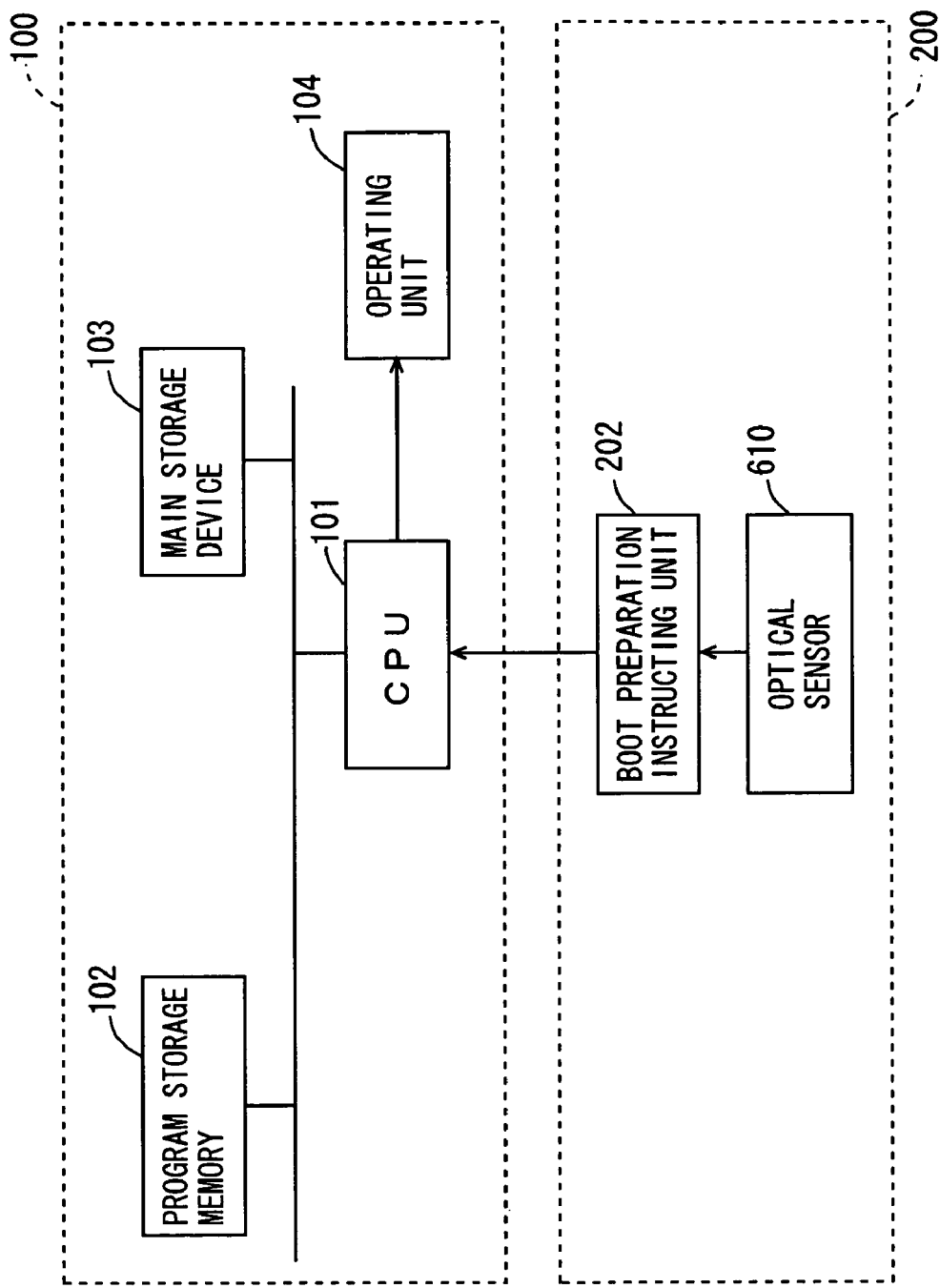
FIG. 17 is a block diagram showing the configuration of an electronic apparatus that includes a boot time reducing device according to an eighth embodiment of the invention

FIG. 17 is a block diagram showing the configuration of an electronic apparatus that includes a boot time reducing device according to an eighth embodiment of the invention.

The electronic apparatus of FIG. 17 is different from the electronic apparatus of FIG. 15 as will now be described. The normally operating unit 200 includes a boot preparation instructing unit 202 and an optical sensor 610.

The optical sensor 610 measures an amount of light in the vicinity of the electronic apparatus. The boot preparation instructing unit 202 detects the presence of a person based on a variation in the amount of light measured by the optical sensor 610. In other words, the boot preparation instructing unit 202 detects the presence of a person by determining, with an increase in the amount of light in the vicinity of the electronic apparatus, that the person has entered the room to turn on an electric light, and provides a boot preparation instruction to the CPU 101 in the temporary operating unit 100.

In this embodiment, the CPU 101, boot preparation instructing unit 202, and optical sensor 610 form the boot time reducing device.

Figure 18:
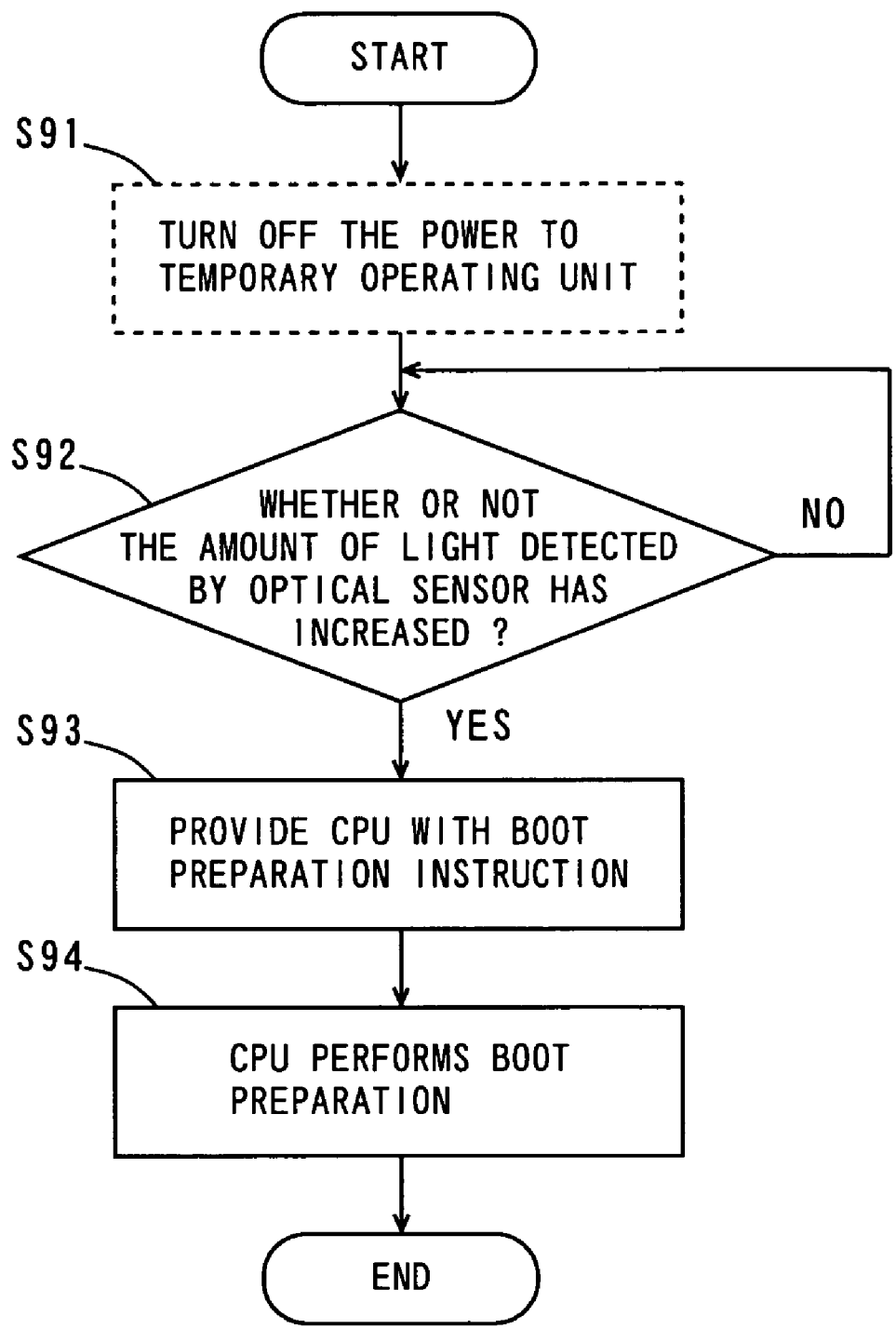
FIG. 18 is a flowchart showing operations of the boot time reducing device in the electronic apparatus of FIG. 17.

FIG. 18 is a flowchart showing operations of the boot time reducing device in the electronic apparatus of FIG. 17.

The user first turns off the power to the temporary operating unit 100 (Step S91). After that, the boot preparation instructing unit 202 determines whether or not the amount of light detected by the optical sensor 610 has increased (Step S92).

When the amount of light detected by the optical sensor 610 has increased, the boot preparation instructing unit 202 provides the CPU 101 with a boot preparation instruction (Step S93). This turns on the power to the temporary operating unit 100, and the CPU 101 performs a boot preparation (Step S94).

After the completion of the boot preparation by the CPU 101, the electronic apparatus boots up in response to a user instruction to boot the electronic apparatus using a remote control etc.

The boot time reducing device according to the embodiment allows the generation of a boot instruction to be predicted by detecting the presence of the user in the vicinity of the electronic apparatus based on an increase in the amount of peripheral light. In this way, the boot preparation can be started before the electronic apparatus boot timing, resulting in a reduced time between the boot timing and the time that the electronic apparatus becomes usable.

For an electronic apparatus comprising a personal computer and a digital television module, in particular, the boot preparation for the personal computer requiring a long time in booting can be started before the boot timing for the digital television module. This results in a reduced boot time of the electronic apparatus.

In the case where the user does not instruct to boot the electronic apparatus before a specific time elapses after the completion of a boot preparation, the boot preparation is released as in the second embodiment.

In this embodiment, the CPU 101 corresponds to a controller and a processing device; the optical sensor 610 corresponds to a sensor; the boot preparation instructing unit 202 corresponds to an instruction generator; and the program storage memory 102 corresponds to a program storage device.

Ninth Embodiment

Figure 19:
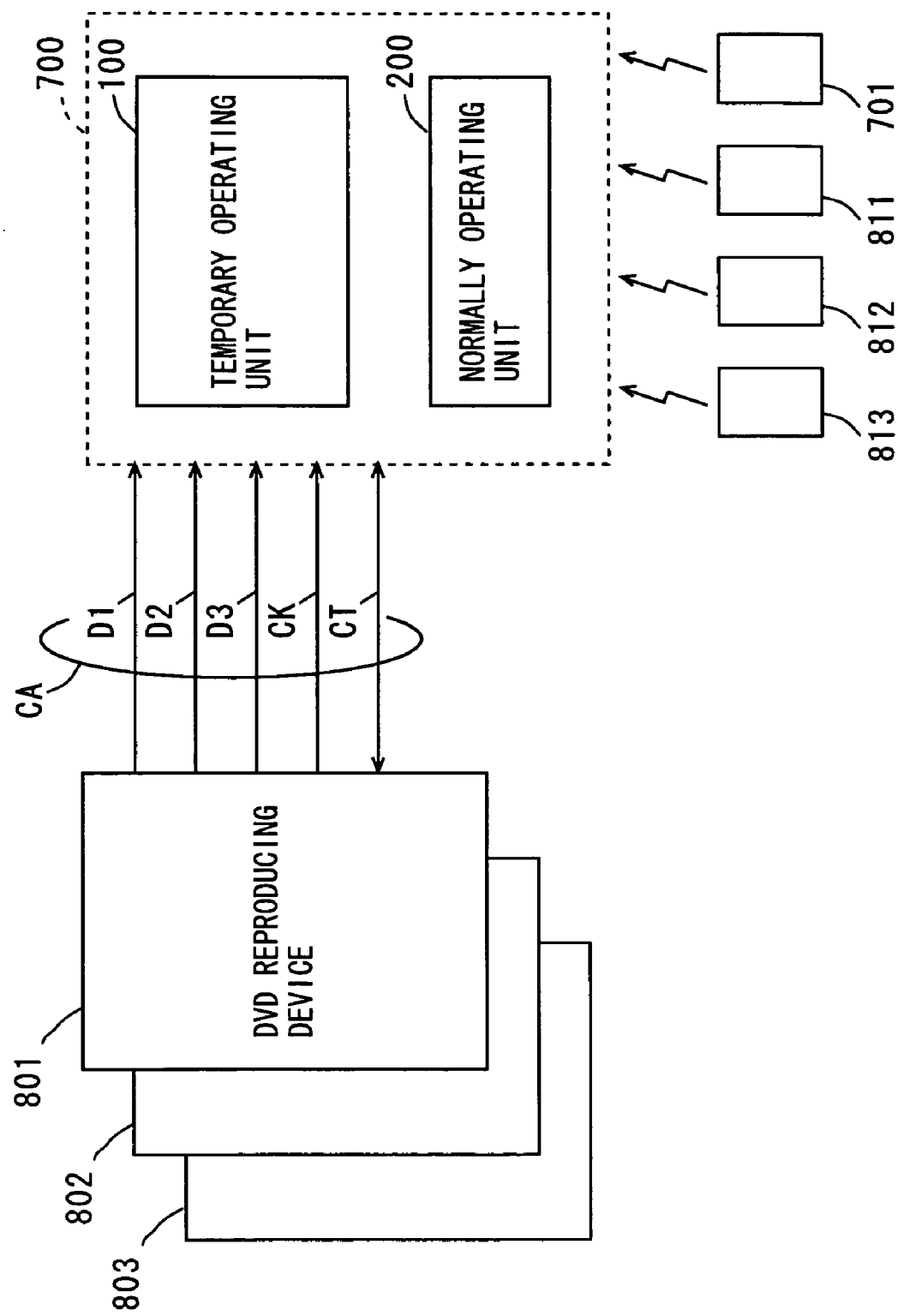
FIG. 19 is a block diagram showing the configuration of an electronic apparatus according to a ninth embodiment of the invention.

FIG. 19 is a block diagram showing the configuration of an electronic apparatus according to a ninth embodiment of the invention.

As shown in FIG. 19, the electronic apparatus comprises a digital television 700 and DVD (digital versatile disk) reproducing devices 801, 802, 803. The digital television 700 includes a temporary operating unit 100 and a normally operating unit 200. The DVD reproducing devices 801, 802, 803 correspond to temporary operating units.

A radio signal is applied to the digital television 700 from a remote control 701 for the digital television 700, a remote control 811 for the DVD reproducing device 801, a remote control 812 for the DVD reproducing device 802 or a remote control 813 for the DVD reproducing device 803.

In this embodiment, the remote controls 701, 811, 812, 813 each include the boot preparation instructing unit 202 and sensor 501 of FIG. 7, while the normally operating unit 200 includes a remote control receiver 400. Each of the boot preparation instructing units 202 detects the user touching the corresponding remote control 701, 811, 812 or 813 based on a signal outputted from the sensor 501, and provides a boot preparation instruction to the temporary operating unit 100 through the remote control receiver 400 in the normally operating unit 200. A method of providing the boot preparation instruction to the temporary operating unit 100 may be any of the methods as described in the aforementioned first embodiment to eighth embodiment.

The digital television 700 and DVD reproducing devices 801, 802, 803 are connected over an HDMI (high-definition multimedia interface)-interface cable CA, compatible with a digital interface standard referred to as the HDMI standard. The HDMI-interface cable CA includes data lines D1, D2, D3, a pixel clock line CK, and a control line CT.

With the HDMI standard, it is possible to transmit video data while transmitting supplemental data during blanking intervals (vertical and horizontal blanking intervals) of the video data. The supplemental data contains audio data (an audio packet) as well as a data packet referred to as InfoFrame (information frame). A variety of information (additional data) can be transmitted using InfoFrame.

The DVD reproducing devices 801, 802, 803 each transfer a pixel component B (blue video data), a pixel component G (green video data), and a pixel component R (red video data) to the digital television 700 via the data lines D1, D2, D3 in synchronization with the pixel clock on the pixel clock line CK.

In addition, a variety of instructions can be transmitted bidirectionally over the control line CT between the digital television 700 and the DVD reproducing devices 801, 802, 803.

Figure 20:
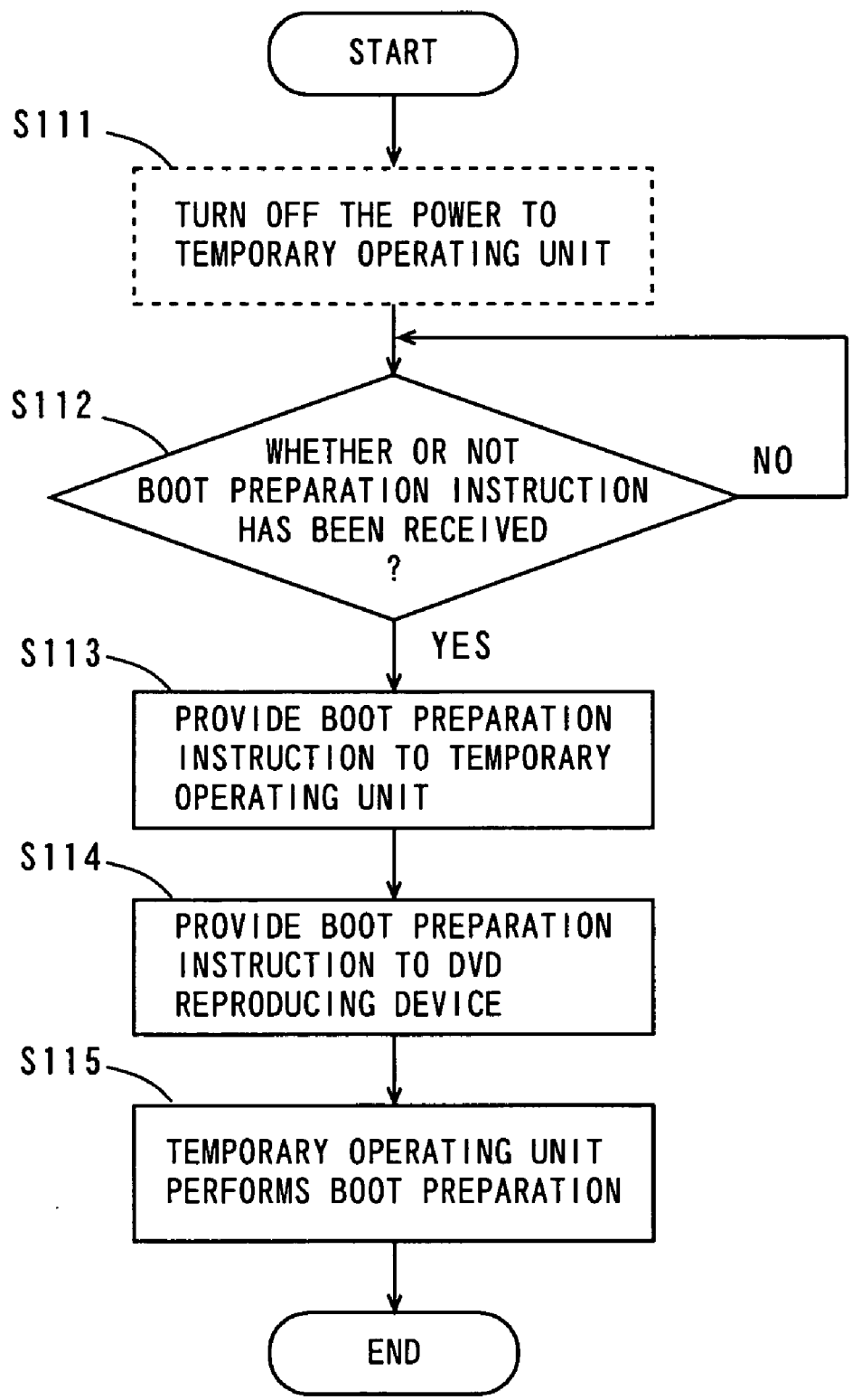
FIG. 20 is a flowchart showing operations of the electronic apparatus of FIG. 19.

FIG. 20 is a flowchart showing operations of the electronic apparatus of FIG. 19.

The user first turns off the power to the digital television 700 and the temporary operating unit 100 of each of the DVD reproducing devices 801, 802, 803 (Step S111). After that, the normally operating unit 200 determines whether or not a boot preparation instruction has been received from any of the remote controls 701, 811, 812, 813 (Step S112).

Upon receipt of a boot preparation instruction from the remote control 701, the normally operating unit 200 provides the boot preparation instruction to the temporary operating unit 100 (Step S113). Upon receipt of a boot preparation instruction from any of the remote controls 811, 812, 813, the digital television 700 issues a request-to-send via the control line CT to the DVD reproducing device that corresponds to the remote control from which the boot preparation instruction was transmitted, and then receives a acknowledgment-to-send from the corresponding DVD reproducing device. After that, the normally operating unit 200 provides the boot preparation instruction to the DVD reproducing device through the control line CT on the HDMI-interface cable CA. This turns on the power to the temporary operating unit 100, which then performs a boot preparation (Step S115). Simultaneously, the DVD reproducing device performs a boot preparation.

After the completion of the boot preparation instruction by the CPU 101, the user instructs to boot the digital television 700 or any of the DVD reproducing devices 801, 802, 803 using any of the corresponding remote controls 701, 811, 812, 813 to boot the digital television 700 or any of the DVD reproducing devices 801, 802, 803.

With the boot time reducing device according to the embodiment, the boot preparation for any of the digital television 700 and DVD reproducing devices 801, 802, 803 connected through the HDMI-interface cable CA can be started using any of the corresponding remote controls 701, 811, 812, 813.

In this embodiment, the digital television 700 corresponds to an electronic apparatus; the DVD reproducing devices 801, 802, 803 correspond to one or more devices; and the HDMI-interface cable CA corresponds to an interface bus or a bidirectional interface bus.

The invention claimed is:

1. A boot time reducing device for reducing a boot time of an electronic apparatus that boots up in response to a boot instruction, the device comprising:
a controller that performs a boot process of said electronic apparatus in response to a boot instruction; and
a boot preparation instructing unit that predicts a timing of generation of said boot instruction, and instructs performing of at least part of said boot process at a timing earlier than the predicted boot instruction timing;
wherein said controller performs the at least part of said boot process of said electronic apparatus in response to the instruction of said boot preparation instructing unit,
said boot preparation instructing unit includes:
a sensor that detects the presence or approach of a person; and
an instruction generator that instructs said controller to perform the at least part of said boot process based on a detection by said sensor.

2. The boot time reducing device according to claim 1, wherein said sensor includes an infrared sensor that detects the presence or approach of a person by infrared radiation.

3. The boot time reducing device according to claim 1, wherein said sensor includes a voice input device that detects the presence or approach of a person based on voice input.

4. The boot time reducing device according to claim 3, wherein said sensor further includes:
a storage device that stores information on the voice print of a registered person; and
a determiner that determines the presence or approach of the registered person by a comparison of a voice inputted through said voice input device with the information stored in said storage device, and wherein
said instruction generator instructs said controller to perform the at least part of said boot process when said determiner has determined that the registered person is present or approached.

5. The boot time reducing device according to claim 1, wherein said sensor includes:
a storage device that stores information for identifying a registered radio device;
a receiver that receives a signal from the radio device; and
a determiner that determines the presence or approach of the registered radio device by a comparison of the signal received through said receiver with the information stored in said storage device, and wherein
said instruction generator instructs said controller to perform the at least part of said boot process when said determiner has determined that the registered radio device is present or approached.

6. The boot time reducing device according to claim 1, wherein said sensor includes a power measuring device that detects the presence or approach of a person based on a change in power consumption.

7. The boot time reducing device according to claim 1, wherein said sensor includes an optical sensor that detects the presence or approach of a person based on a change in an amount of light.

8. A boot time reducing device for reducing a boot time of an electronic apparatus that boots up in response to a boot instruction, the device comprising:
a controller that performs a boot process of said electronic apparatus in response to a boot instruction;
a boot preparation instructing unit that predicts a timing of generation of said boot instruction, and instructs performing of at least part of said boot process at a timing earlier than the predicted boot instruction timing; and
a manipulation device that generates an instruction to boot said electronic apparatus by user manipulation,
wherein said controller performs the at least part of said boot process of said electronic apparatus in response to the instruction of said boot preparation instructing unit,
said boot preparation instructing unit includes
a predictor that predicts manipulation of said manipulation device by the user; and
an instruction generator that instructs said controller to perform the at least part of said boot process based on a prediction by said predictor,
wherein said predictor includes at least one of the following:
a pressure sensor detecting that a user has touched said manipulation device based on a change in pressure;
a temperature sensor detecting that the user has touched said manipulation device based on a change in temperature; and
a gyrosensor detecting that the user has moved said manipulation device based on a change in angular velocity.

9. The boot time reducing device according to claim 8, further comprising a setting device that presets a boot timing for said electronic apparatus,
    wherein said boot preparation instructing unit instructs said controller to perform the at least part of said boot process at a timing earlier by a prescribed time than the boot timing set by said setting device.

10. The boot time reducing device according to claim 8, further comprising a storage device that stores a timing at which said electronic apparatus was booted,
    wherein said boot preparation instructing unit instructs said controller to perform the at least part of said boot process at a timing earlier by a prescribed time than the timing stored in said storage device.

11. The boot time reducing device according to claim 8, wherein said electronic apparatus includes:
    a program stdrage device that stores a program;
    a main storage device; and
    a processing device that executes the program stored in said program storage device on said main storage device, wherein
    the at least part of said boot process includes at least one of expanding the program, transferring the program from said program storage device to said main storage device, and executing part of said program.

12. A boot time reducing device for reducing a boot time of an electronic apparatus that boots up in response to a boot instruction, the device comprising:
    a controller that performs a boot process of said electronic apparatus in response to a boot instruction; and
    a boot preparation instructing unit that predicts a timing of generation of said boot instruction, and instructs performing of at least part of said boot process at a timing earlier than a predicted boot instruction timing;
    wherein said controller performs the at least part of said boot process of said electronic apparatus in response to the instruction of said boot preparation instructing unit, and
    said controller releases said boot process when said controller fails to receive a boot instruction within a prescribed time after the beginning of performing the at least part of said boot process of said electronic apparatus.

13. A boot time reducing device for reducing a boot time of an electronic apparatus that boots up in response to a boot instruction, the device comprising:
    a controller that performs a boot process of said electronic apparatus in response to a boot instruction; and
    a boot preparation instructing unit that predicts a timing of generation of said boot instruction, and instructs performing of at least part of said boot process at a timing earlier than a predicted boot instruction timing;
    wherein said controller performs the at least part of said boot process of said electronic apparatus in response to the instruction of said boot preparation instructing unit,
    said electronic apparatus comprises a television module that displays a television program and a personal computer connected to said television module, and
    said controller performs at least part of a boot process of said personal computer in response to an instruction of said boot preparation instructing unit.

\* \* \* \* \*

UNITED STATES PATENT AND TRADEMARK OFFICE
CERTIFICATE OF CORRECTION

PATENT NO. : 7,257,702 B2 Page 1 of 1
APPLICATION NO. : 10/548290
DATED : August 14, 2007
INVENTOR(S) : Yamada et al.

It is certified that error appears in the above-identified patent and that said Letters Patent is hereby corrected as shown below:

In column 21, line 17 (claim 11, line 3) of the printed patent, "stdrage" should be --storage--.

Signed and Sealed this

Tenth Day of June, 2008

JON W. DUDAS
*Director of the United States Patent and Trademark Office*